United States Patent [19]

Weiman

[11] Patent Number: 6,141,690
[45] Date of Patent: *Oct. 31, 2000

[54] COMPUTER NETWORK ADDRESS MAPPING

[75] Inventor: Lyle A. Weiman, Cupertino, Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/904,053

[22] Filed: Jul. 31, 1997

[51] Int. Cl.[7] .................................................. G06F 15/16
[52] U.S. Cl. .......................... 709/228; 709/227; 709/245; 709/230
[58] Field of Search .......................... 395/200.58, 200.75; 709/227, 228, 245, 230, 238, 239, 242

[56] References Cited

U.S. PATENT DOCUMENTS

| | | | |
|---|---|---|---|
| 4,736,371 | 4/1988 | Tejima et al. | 370/95 |
| 4,771,391 | 9/1988 | Blasbalg | 364/514 |
| 4,926,416 | 5/1990 | Weik | 370/60.1 |
| 5,018,136 | 5/1991 | Gollub | 370/60.1 |
| 5,185,860 | 2/1993 | Wu | 395/200 |
| 5,410,543 | 4/1995 | Seitz et al. | 370/85.13 |
| 5,430,727 | 7/1995 | Callon | 370/85.13 |
| 5,442,633 | 8/1995 | Perkins et al. | 370/94.1 |
| 5,491,800 | 2/1996 | Goldsmith et al. | 395/200.12 |
| 5,517,618 | 5/1996 | Wada et al. | 395/200.15 |
| 5,523,999 | 6/1996 | Takano et al. | 370/58.2 |
| 5,526,489 | 6/1996 | Nilakantan et al. | 395/200.02 |
| 5,541,919 | 7/1996 | Yong et al. | 370/61 |
| 5,572,528 | 11/1996 | Shuen | 370/85.13 |
| 5,781,550 | 7/1998 | Templin et al. | 370/401 |
| 5,845,079 | 12/1998 | Wada et al. | 709/223 |
| 5,862,345 | 1/1999 | Okanoue et al. | 709/238 |

OTHER PUBLICATIONS

Network Interrupts, A Programmer's Reference To Network APIs, Ralph Brown, et al., Jan. 1994, pp. 147–156, Addison–Wesley Publishing Company.

IP in IP Tunneling, W. Simpson, Network Working Group Request For Comments: 1853, Oct. 1995, Internet URL: http://ds.internic.net/rfc/rfc 1853.txt, seven pages.

*Primary Examiner*—Zarni Maung
*Assistant Examiner*—Saleh Najjar
*Attorney, Agent, or Firm*—Jack A. Lenell

[57] ABSTRACT

Apparatus and method for computer network configuration and address mapping. The invention provides for connecting mobile laptop PCs to a network, without the need to re-configure its network configuration parameters every time. The invention includes a device having a protocol stack configured with a network level protocol address that identifies a first tap point of a local network, so as to provide for data communications between the portable device and a local device connected to a second tap point of the local network, when the portable device is connected to the network at the first tap point of the local network. The invention further includes network equipment for providing data communications between the portable device and the local device when the portable device is disconnected from the local network and is connected to a remote network, while still using the protocol stack of the portable device configured with the network level protocol address that identifies the first tap point of the local network.

5 Claims, 37 Drawing Sheets

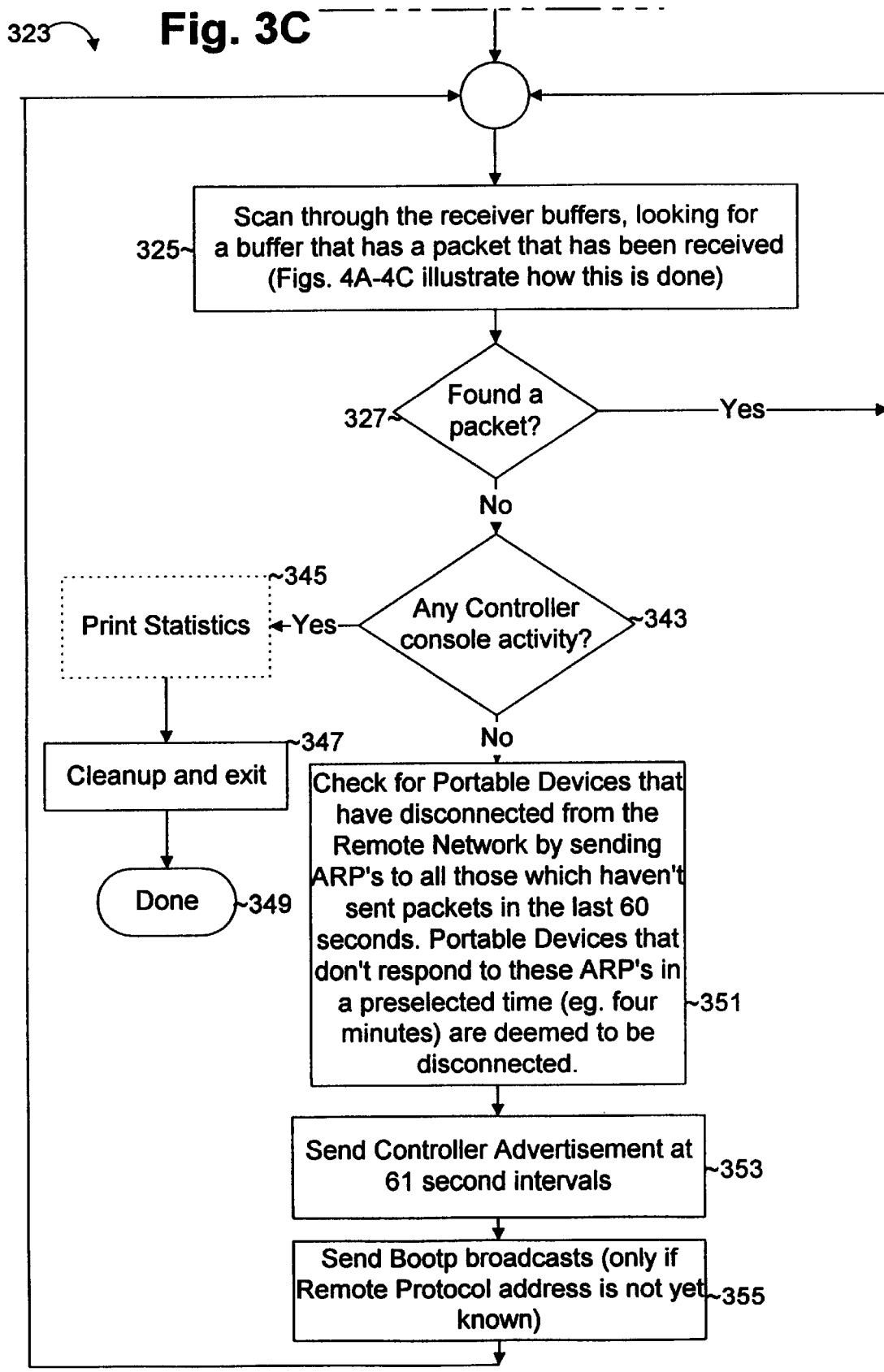

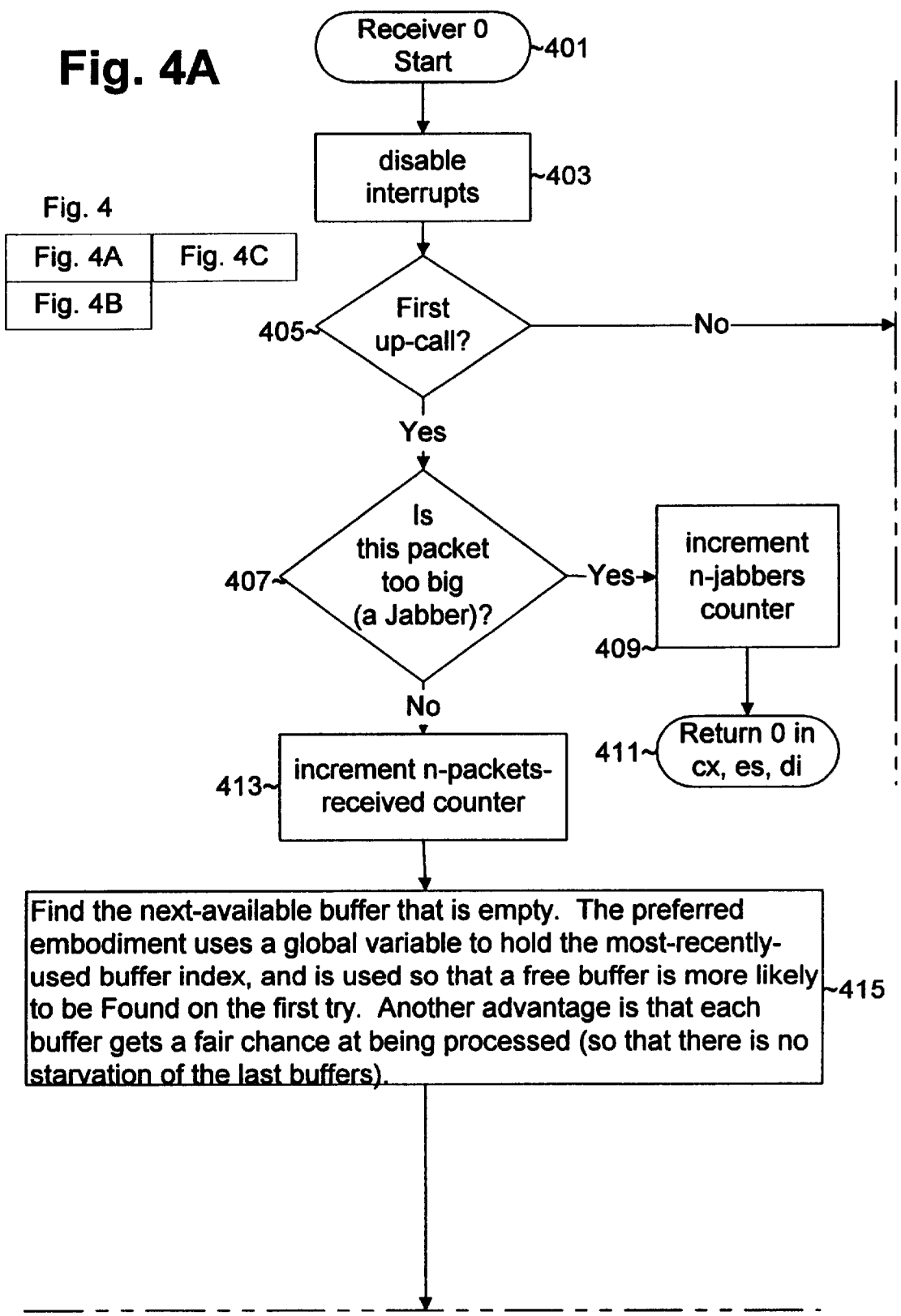

Fig. 5A
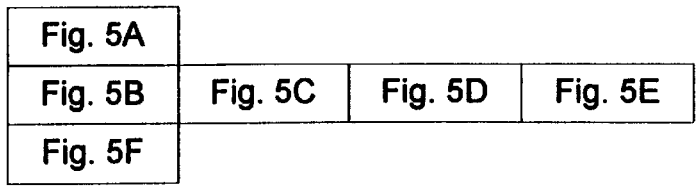
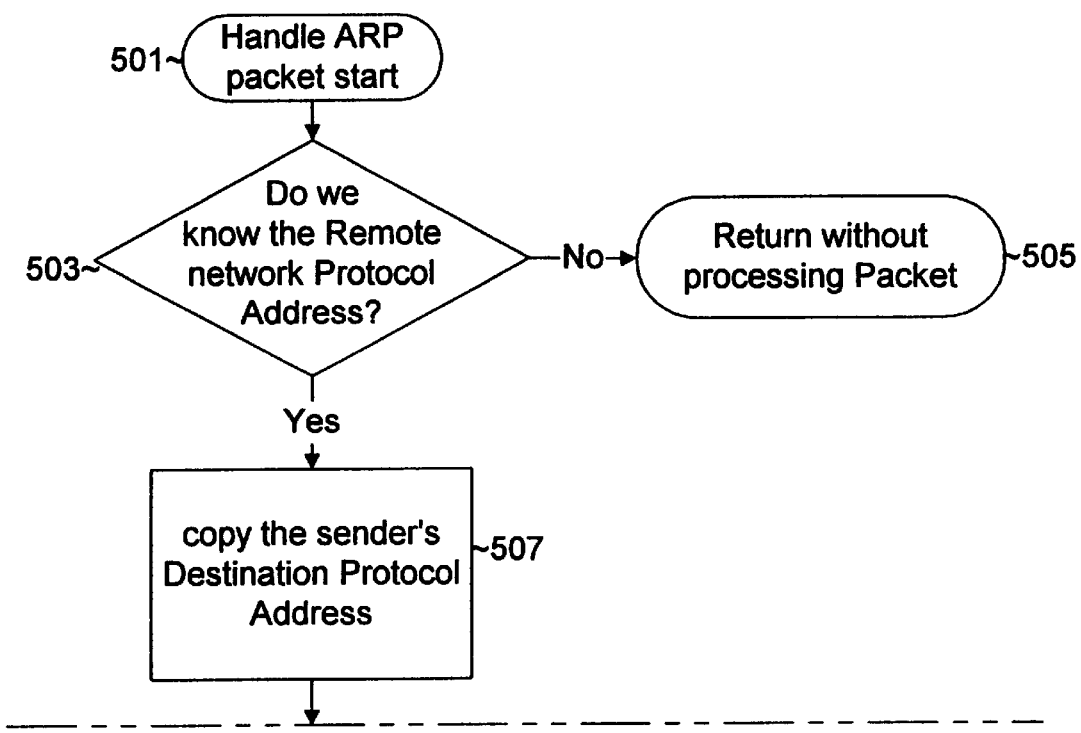

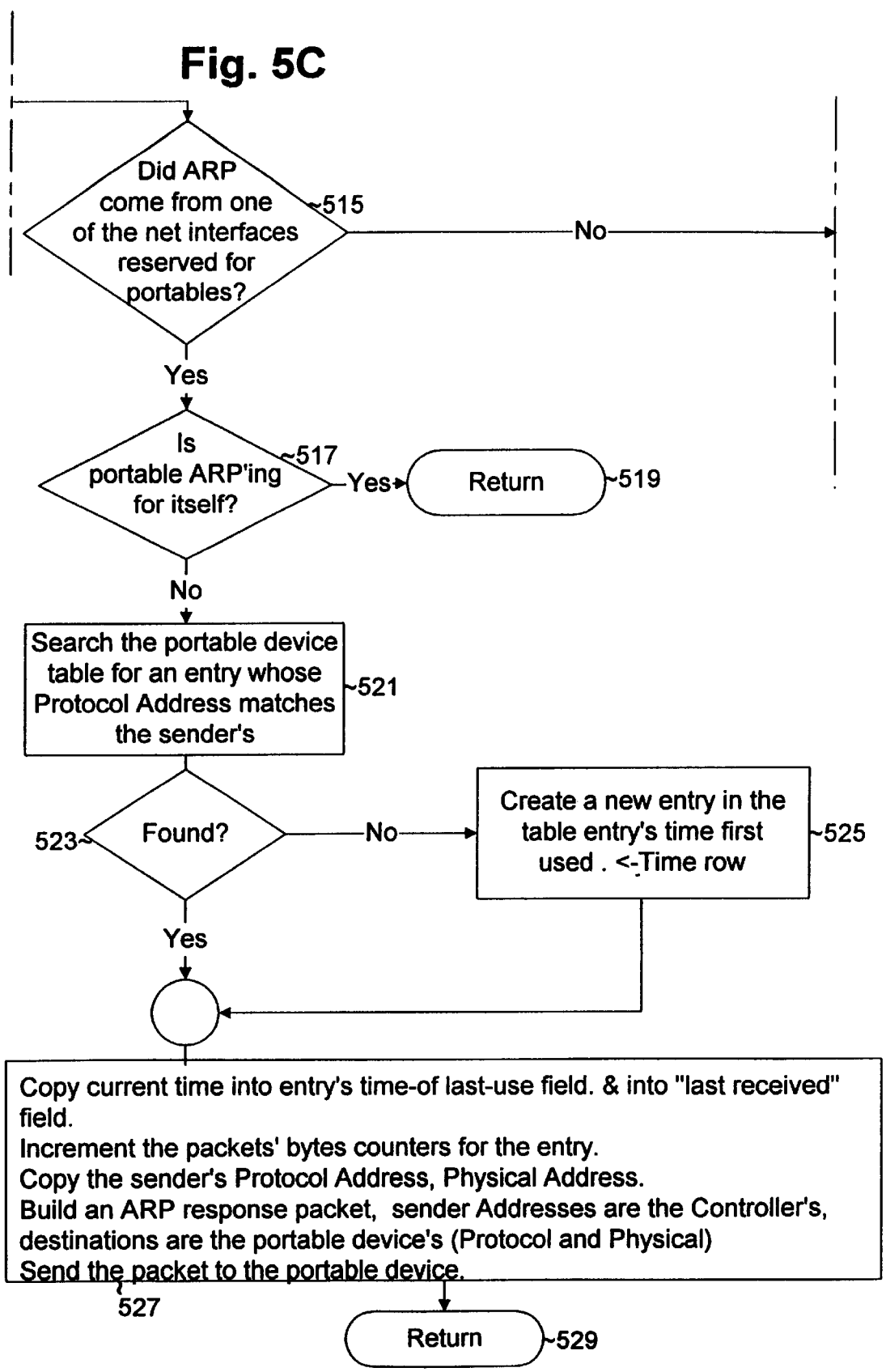

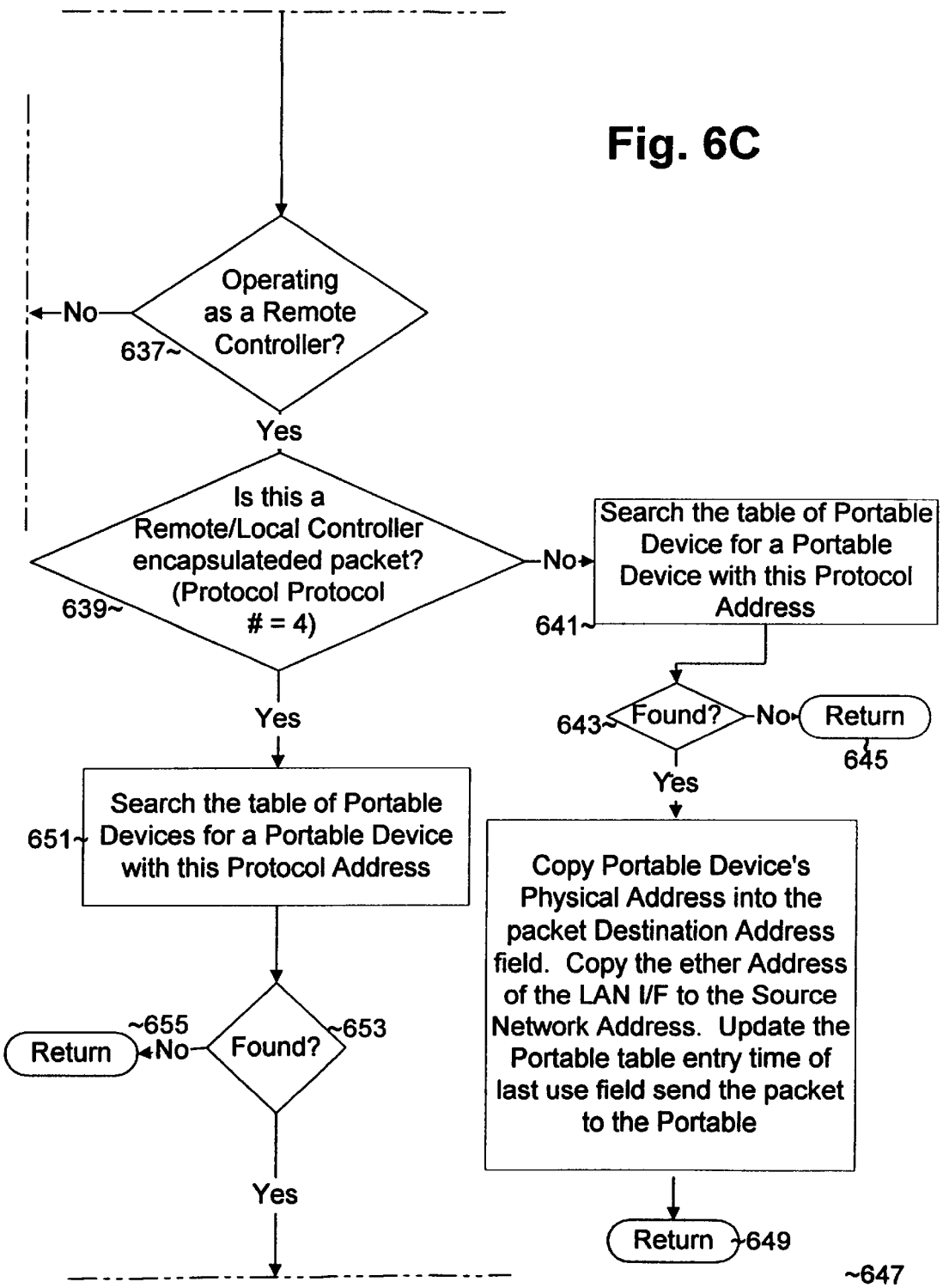

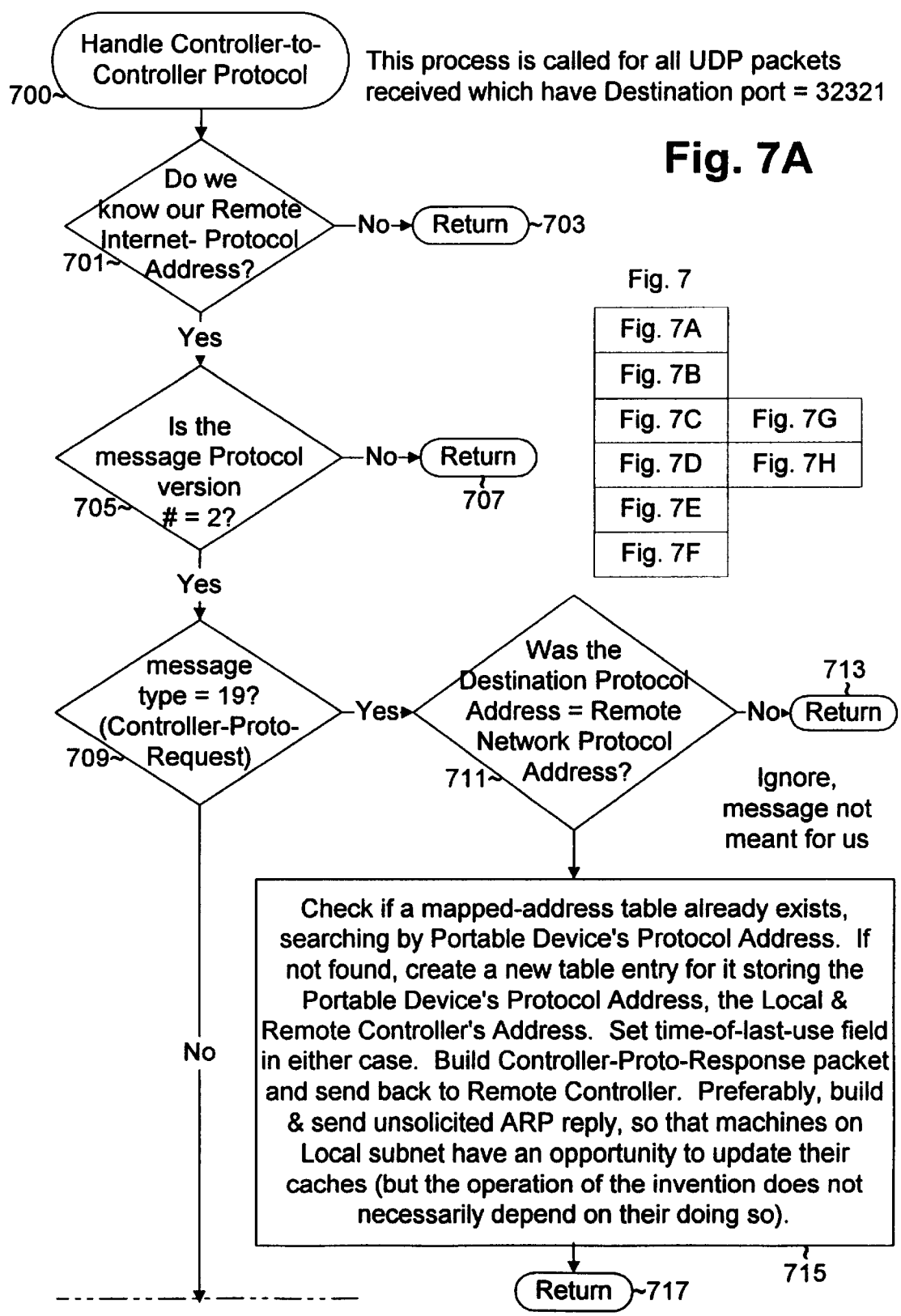

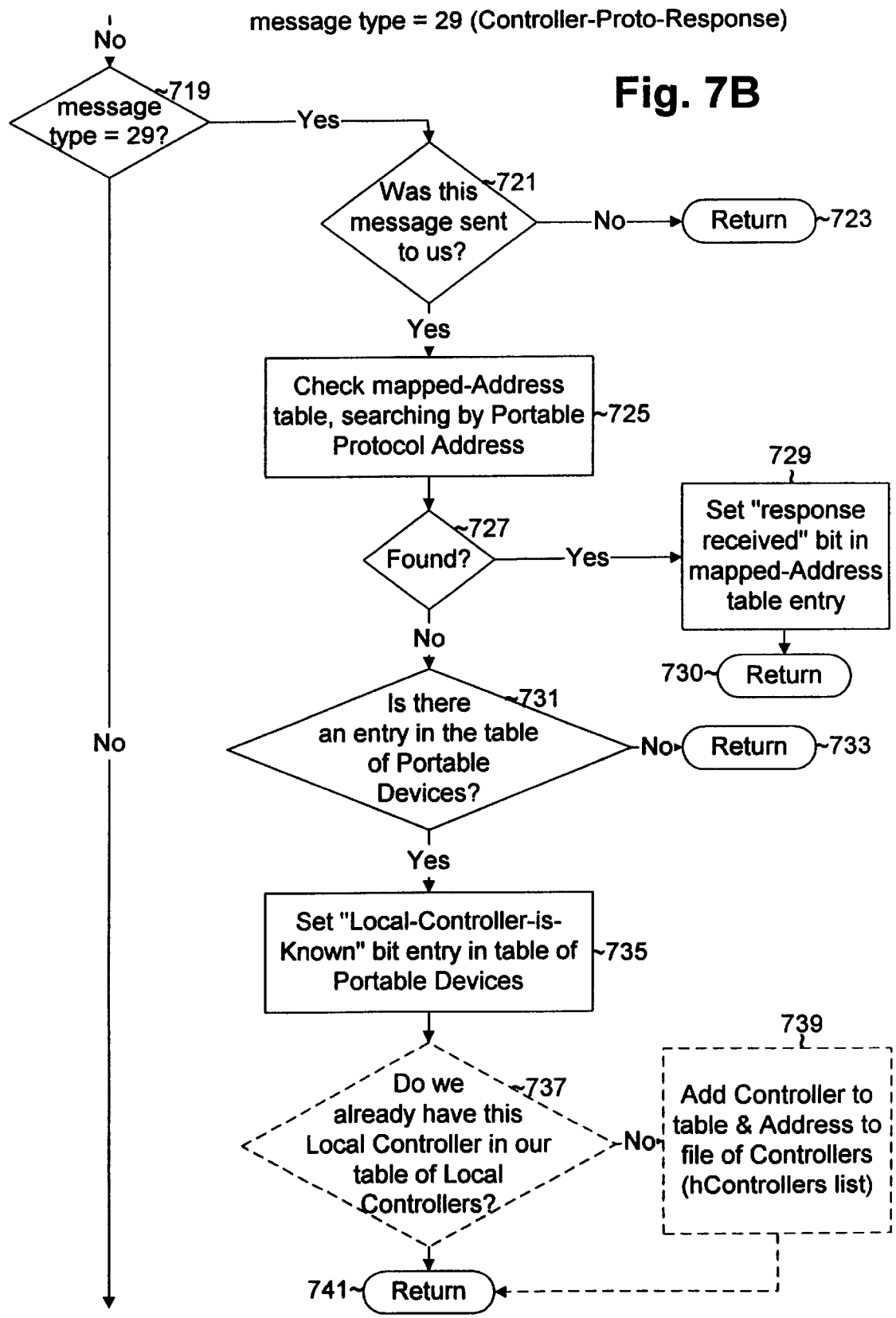

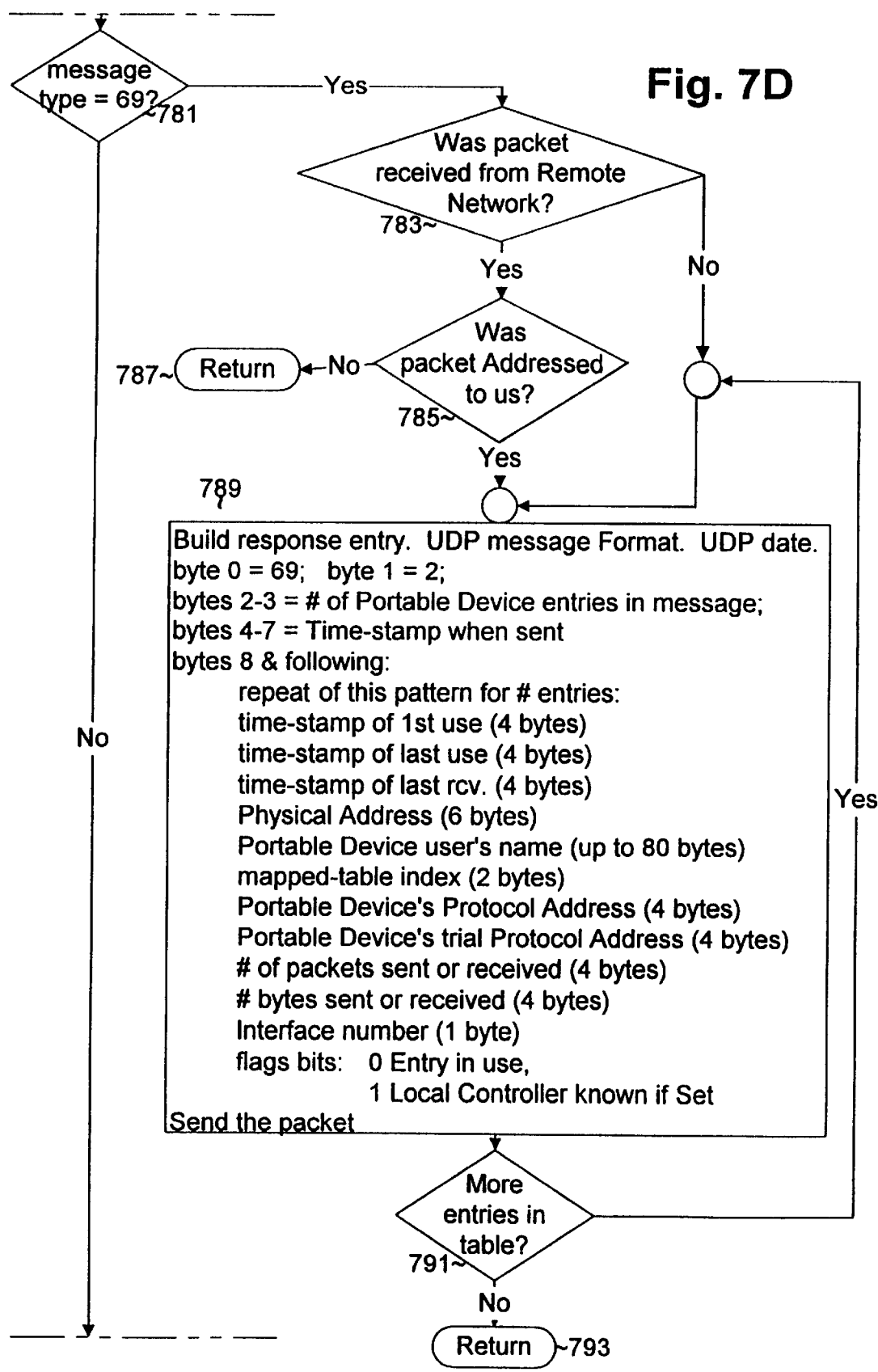

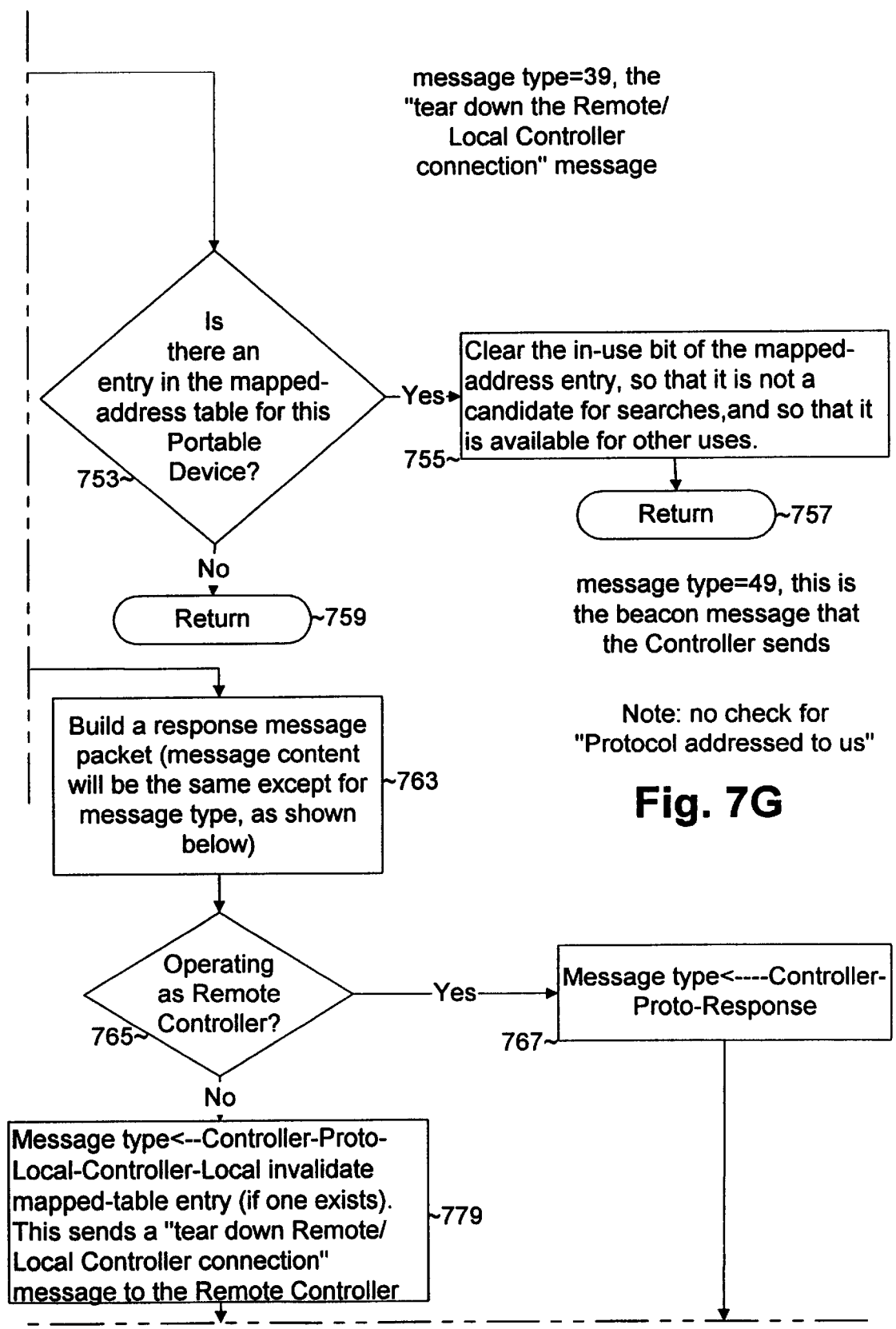

FIG. 8

| Mapped - address table |
|---|
| Portable Device Network Level Protocol Address |
| Remote Controller Network Level Protocol Address |
| Local Controller Network Level Protocol Address |
| First - used time |
| Last - used time |
| Last - received-from time |
| Flags: In-use Indicator |
| Response to Controller-Proto-Request received |

| ARP Cache |
|---|
| Physical Address |
| Network Level Protocol Address |
| Local Controller Network Level Protocol Address |
| First - used time |
| Time-of-last-use |
| Flags: In-use indicator |
| Waiting-for response (if set --> Physical Address field is not valid) |

| Table of Portable Devices |
|---|
| Time-of-first use |
| Last-used-time |
| Last-received-time |
| Portable Device's Physical Address |
| Name of User of Portable Device |
| Mapped-address table index |
| Portable Device Network Level Protocol Address |
| Local Controller trial Network Level Protocol Address |
| Counters for # of packets & # of bytes sent & received |
| Interface number |
| Flags: In-use indicator |
| Local-Controller-is-known indicator |

COMPUTER NETWORK ADDRESS MAPPING

FIELD OF THE INVENTION

The invention relates to data communication and more particularly to an apparatus and method for computer network configuration and address mapping to provide convenient, secure and flexible high speed communication between devices on the computer network.

BACKGROUND OF THE INVENTION

Computer networks provide for data communications between data processing equipment. For example, data processing devices such as portable lap-top computers, desk-top personal computers, file servers, mini-computers, mainframe computers, printers, and the like can be interconnected using a computer network to advantageously share programs, data, and other information resources.

Devices located in a proximate area are interconnected to one another on the same network sub-net. Remotely located devices are interconnected to one another on a different network subnet, however devices located in proximate and remote areas can be connected by connecting the network subnets.

An example of a popular computer network is generally known as an "Ethernet" local area network, or as specified by the International Standards Organization in ISO 8802/3. Ethernet advantageously provides fast data transmission rates of 10 Megabits per second, and can be extended to 100 Megabits per second or more.

For network communication, each device is mechanically and electrically connected to the computer network at a respective tap point of the network. Each tap point of the network is identified by a respective computer network address. The computer network addresses are used in transmitting data between devices connected to the network.

Data is transmitted over the computer network in formatted data packets, each comprising, for example, an ordered arrangement of a preamble 101, a start-of-frame indicator 103, a destination address segment 105 for indicating the computer network address of a tap point of the network for receiving data, a source address segment 107 for indicating the computer network address of a tap point of the network for transmitting data, an information length segment 107, an information segment 111, and a frame check segment 113, as shown for example in FIG. 1. Other alternative ordered arrangements of segments within the complete data frame are also known to those skilled in the art. The computer network addresses are used by switching equipment of the network to control routing of the data packets.

For typical network use, each device connected to the network must have a register entry of the respective computer network address (which is called an "IP Address", IP standing for Internet Protocol) for identifying the respective tap point of the network. For example, for typical network use of a portable lap-top computer in a particular office, the portable lap-top computer must have a register entry of a first computer network address for identifying a predetermined tap point of the local network. If the portable lap-top computer is disconnected from the network, moved, and then reconnected elsewhere, for example for use in a remote conference room, reconfiguration is needed to change the register entry, so that the portable lap-top computer has a register entry of a second computer network address for identifying a second tap point of the network. Such reconfiguration is again required upon returning to the previous location, and once again for network use in each subsequent remote location. Performing such reconfiguration manually is a burdensome task and is prone to errors, especially for a typical computer user of business application programs, who is lacking in that particular technical skill.

Even if such reconfiguration is correctly effected, other limitations still remain. Typically network security systems, firewalls, access control schemes, network file system (NFS), and the like limit access based upon computer network addresses and tap points of the network. Accordingly, a hypothetical network security system allows network access to important files on a file server using the portable lap-top computer in the particular office, because the network security system recognizes the first tap point of the network, and also recognizes the first computer network address that identifies the first tap point of the network. However if that portable lap-top computer is disconnected from the network, moved, reconnected elsewhere, such as in the remote conference room, and then reconfigured as discussed previously herein, the network security systems refuse to allow access to the important files on the file server. This is because the network security system does not recognize the second tap point of the network, and does not recognize the second computer network address that identifies the second tap point of the network.

So called "wire-less modems", cellular telephone modems, and the like provide some advantages, but there are also limitations. For wire-less modems, data rates are not as high as are as those achieved, for example using Ethernet, with a device that is mechanical and electrically connected to the computer network at the tap point of the network. For wire-less modems, different broadcast standards and schemes in different counties prevent convenient universal operation, while hard-wired network connections, for example Ethernet connections, are advantageously operating all over the world. Furthermore, wire-less modems pose greater security risks, since wire-less data transmissions are more easily intercepted than with hard-wired network connections, such as Ethernet connections.

What is needed is an apparatus and method for computer network configuration and address mapping to provide convenient, secure, and flexible high speed communication between devices on the computer network.

SUMMARY OF THE INVENTION

An apparatus and method of the present invention provide for computer network configuration and address mapping, so as to provide convenient, secure, and flexible high speed communication between devices on the computer network. In a preferred embodiment, the invention provides for connecting mobile laptop PCs to a network, without the need to re-configure its network configuration parameters every time.

Briefly and in general terms, the invention includes a portable device having a protocol stack configured with a network level protocol address that identifies a first tap point of a local network, so as to provide for data communications between the portable device and a local device connected to a second tap point of the local network, when the portable device is connected to the local network at the first tap point of the local network. The invention includes network equipment for providing data communications between the portable device and the local device when the portable device is disconnected from the local network and is connected to a remote network, while still using the protocol stack of the portable device configured with the network level protocol address that identifies the first tap point of the local network.

In accordance with the principles of the invention, the network equipment includes a remote controller having a first network interface adapter for connecting with the portable device, and a second network interface adapter connected with the remote network. A local controller is coupled with the remote network, preferably through an Internet protocol network. The local controller is connected near the local device on the local network.

For data communication with the local device, regardless of whether the portable device is connected to the local network or the remote network, the portable device generates an initial data packet having a source address header that includes the network level protocol address that identifies a first tap point of the local network, and a destination address header that includes the network level protocol address, that identifies a second tap point of the local network.

When the portable device is connected to the remote network, the portable device transmits the initial data packet to the remote controller. In response, the remote controller generates at least one subsequent data packet based upon the initial data packet, wherein the subsequent data packet has a source address header that includes the network level protocol address that identifies location of the remote controller, and has a destination address header that includes the network level protocol address that identifies location of the local controller, and has an information segment that encapsulates the network level protocol addresses that identify the first and second tap points of the local network. The remote controller then transmits the subsequent data packet from the remote to the local controller, preferably through an Internet protocol network. In response, the local controller then re-generates the initial data packet based upon the subsequent data packet, and transmits the re-generated initial data packet to the local device.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 8 is a diagram illustrating data structures employed in conjunction with the software of the preferred embodiment of the invention.

DETAILED DESCRIPTION OF THE PREFERRED EMBODIMENT

Figure 1:
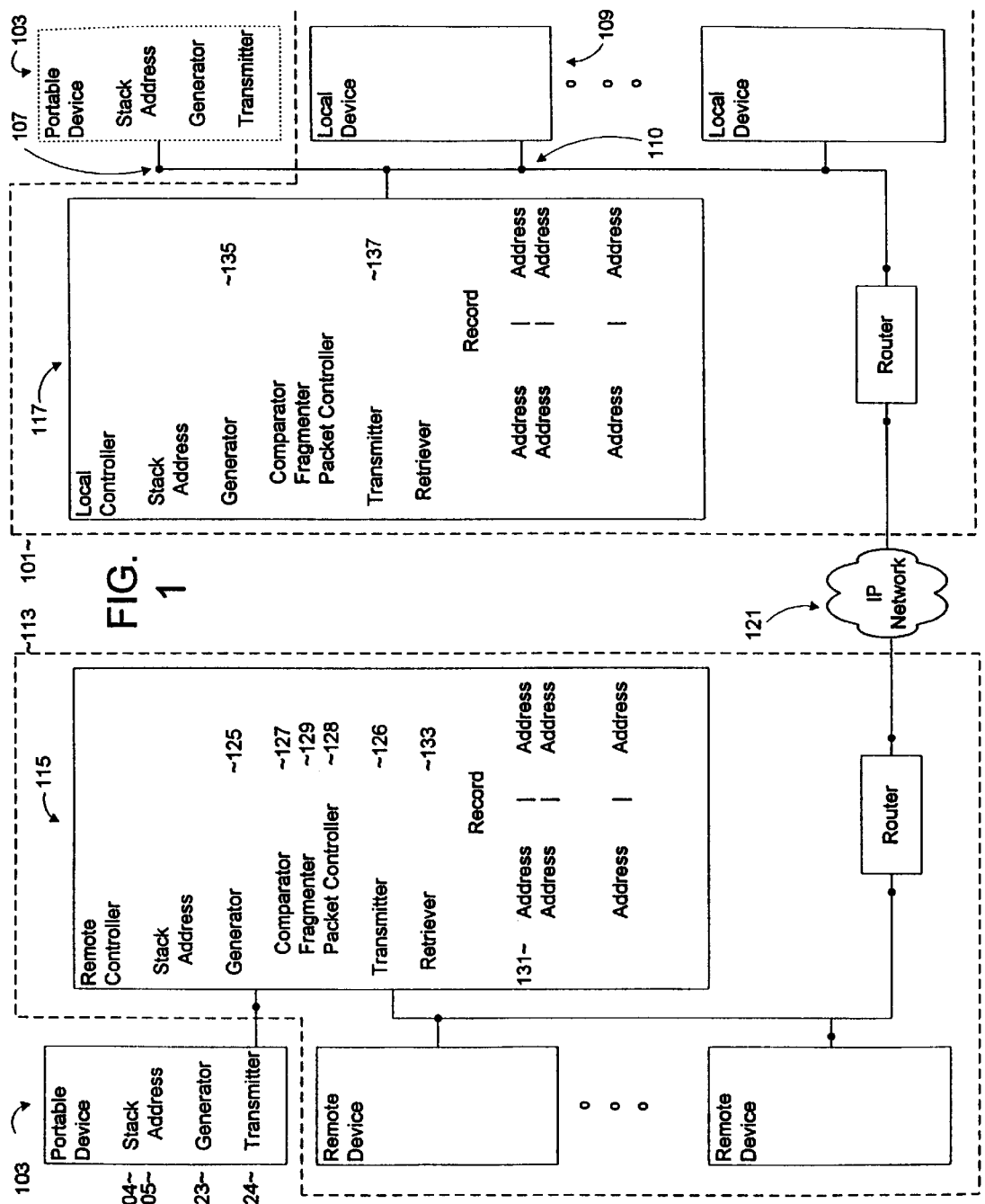
FIG. 1 shows a simplified block diagram of the preferred embodiment of the invention.

As shown in FIG. 1, the present invention provides for flexible mobile data communication with a local network 101. A portable device 103 having a protocol stack 104 is configured with a network level protocol address 105 that identifies a first tap point 107 of the local network 101, so as to provide for data communications between the portable device 103 and a local device 109 connected to a second tap point 110 of the local network 101, when the portable device 103 is connected to the local network 101 at the first tap point 107 of the local network 101.

As discussed in greater detail subsequently herein, the invention includes network equipment for providing data communications between the portable device 103 and the local device 109 when the portable device 103 is disconnected from the local network 101 and is connected to a remote network 113, while still using the protocol stack of the portable device configured with the network level protocol address that identifies the first tap point 107 of the local network 101. In FIG. 1, the portable device 103 is shown near the right side of FIG. 1 outlined in a dotted line for illustrating when the portable device 103 is connected to the local network 101. The portable device 103 is shown again near the left side of FIG. 1 in solid line for illustrating when the portable device 103 is connected to the remote network 113.

In the preferred embodiment, the network equipment includes a remote controller 115 having a first network interface adapter for connecting with the portable device 103, and a second network interface adapter connected with the remote network 113. A local controller 117 is coupled with the remote network 113, preferably through appropriate routers and an Internet protocol network 121. The local controller 117 is connected near the local device 109 on the local network 101, limited only by the distance requirements of the local network.

As shown in FIG. 1, the portable device 103 includes a generator 123 of an initial data packet, which, as discussed in greater detail subsequently herein, has a source address header that includes the network level protocol address 105 that identifies the first tap point 107 of the local network 101, and a destination address header that includes the network level protocol address 105 that identifies the local device coupled to the second tap point 110 of the local network 101. The portable device 103 includes a transmitter for transmitting the initial data packet 213 from the portable device 103 to the remote controller 115, when the portable device is connected to the remote network, as shown on the left side of FIG. 1.

The remote controller 115 includes a generator 125 of at least one subsequent data packet based upon the initial data packet, the subsequent data packet having a source address header that includes the network level protocol address 105 that identifies location of the remote controller 115, having a destination address header that includes the network level protocol address 105 that identifies location of the local controller 117, and having an information segment that encapsulates the network level protocol addresses that identify the first and second tap points of the local network 101.

The generator 125 of the remote controller 115 includes a comparator 127 for comparing a length of a data message of the data packet to a predetermined value. A data message fragmenter 129 is for fragmenting the data message into an initial portion and a remainder portion if the length of the data message is greater than the predetermined value. A data packet controller 128 is for controlling generation of a subsequent data packet including the initial portion and generation of another subsequent data packet including the remainder portion if the length of the data message is greater than the predetermined value.

In the preferred embodiment, the generator 125 of the remote controller 115 further includes a record entry 131 of the network level protocol address 105 for identifying the location of the local controller 117, which is associated with a record entry of the network level protocol address 105 for identifying the second tap point 110 where the local device 109 is connected to the local network 101. A record retriever 133 is for retrieving the network level protocol address 105 for identifying the local controller 117, based upon the network level protocol address 105 for identifying the second tap point 110 where the local device 109 is connected to the local network 101.

The remote controller 115 includes a transmitter 126 for transmitting the subsequent data packet from the remote controller 115 to the local controller 117. The local controller 117 includes a generator 135 for regenerating the initial data packet based upon the subsequent data packet. The local controller 117 includes a transmitter 137 for transmitting the re-generated initial data packet 213 from the local controller 117 to the local device 109.

Figure 2:
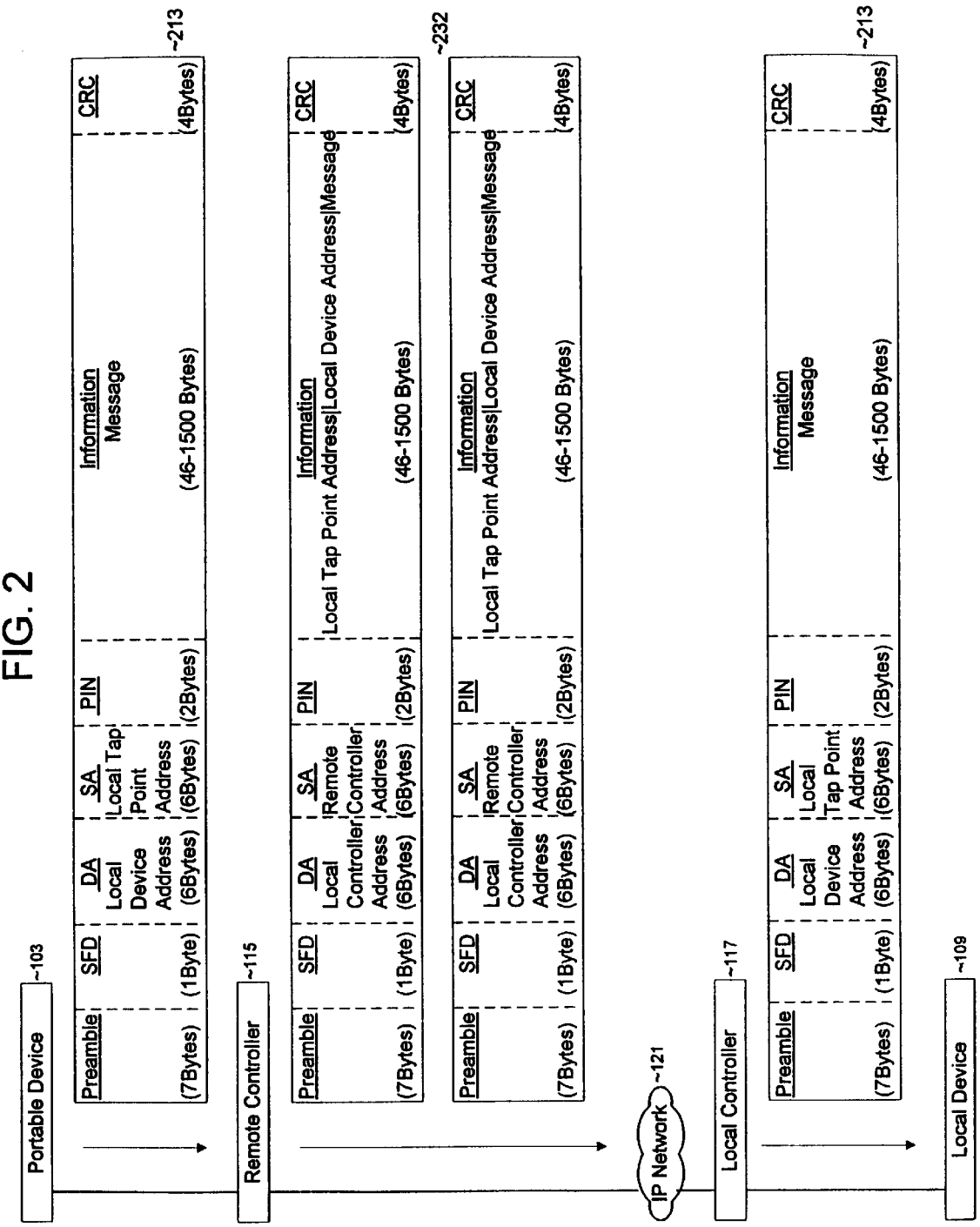
FIG. 2 shows a partial block and message diagram, illustrating operation of the preferred embodiment of the invention of FIG. 1.

FIG. 2 shows a partial block and message diagram, illustrating operation of the preferred embodiment of the invention of FIG. 1. For data communication with the local device, regardless of whether the portable device is connected to the local network or the remote network, the portable device 103 generates the initial data packet 213. In the preferred embodiment, the initial data packet includes: seven bytes of a preamble; a one byte SFD; six bytes of a destination address (DA) header that includes the network level protocol address that identifies the second tap point of the local network; six bytes of a source address header that includes the network level protocol address that identifies a first tap point of the local network; two bytes for a protocol identifier number (PIN) of the packet; a data message is within forty six to fifteen hundred bytes of the information segment; and four bytes for the cyclical redundantcy check (CRC).

When the portable device 103 is connected to the remote network, the portable device transmits the initial data packet to the remote controller 115 as shown in FIG. 2 and discussed previously herein. In response, the remote controller 115 generates at least one subsequent data packet 223 based upon the initial data packet, wherein the subsequent data packet has a source address header (SA) that includes the network level protocol address that identifies location of the remote controller, and has a destination address header (DA) that includes the network level protocol address that identifies location of the local controller, and has an information segment that encapsulates the network level protocol addresses that identify the first and second tap points of the local network. As discussed previously herein, the local device is connected to the second tap point. Accordingly, since the address of the second tap point identifies the local device, the address of the second tap point is shown in FIG. 2 as the local device address. For the sake of simplicity, the first local tap point address is shown in FIG. 2 as the local tap point address.

As shown in FIG. 2, the remote controller then transmits the one or more subsequent data packets 232 from the remote to the local controller, preferably through an Internet protocol network 121. In response, the local controller then re-generates the initial data packet 213 based upon the one or more subsequent data packets 232, and transmits the re-generated initial data packet 214 to the local device 109.

Figure 3A:
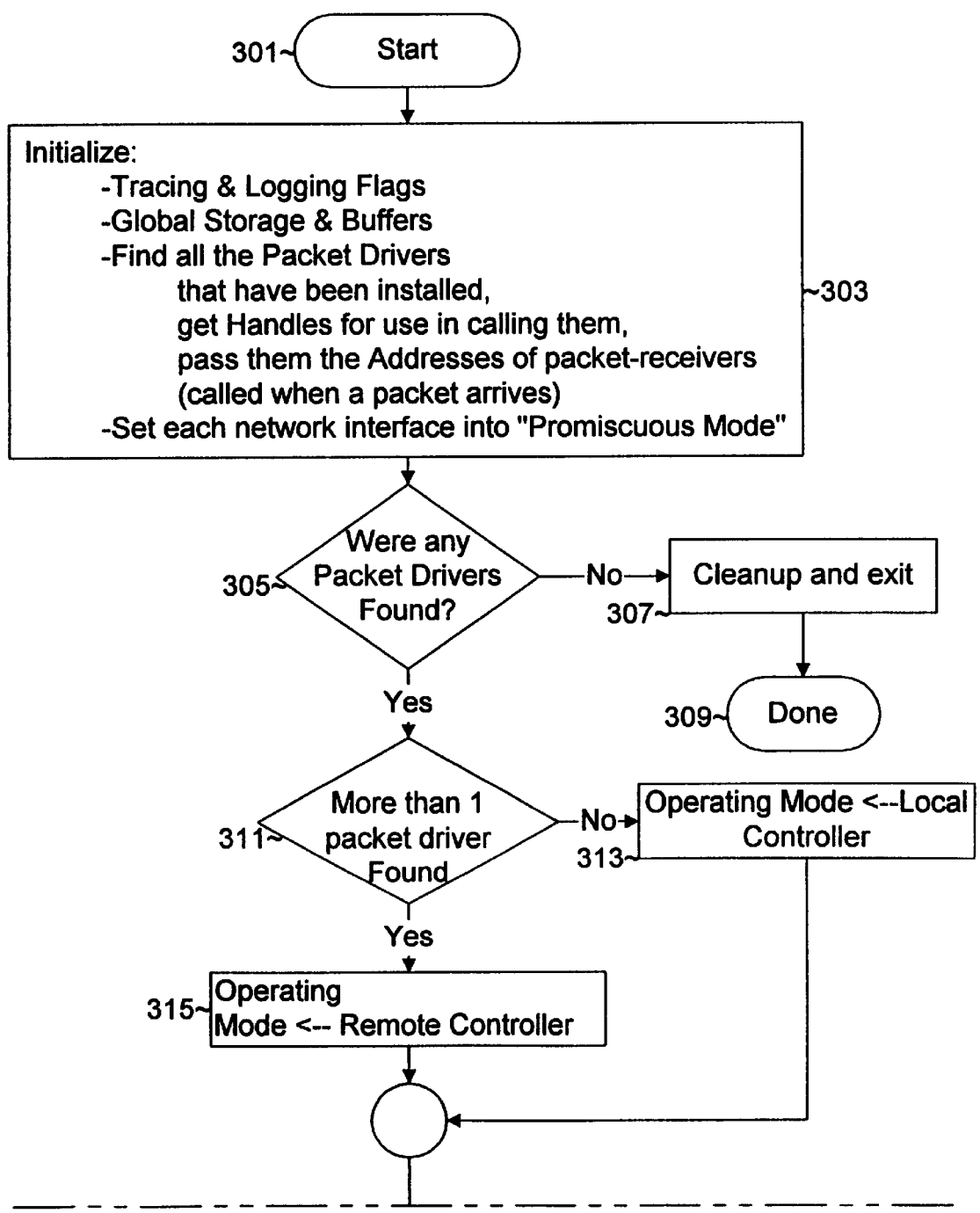
FIGS. 3, 4, 5, 6, and 7 show flowcharts illustrating software employed in conjunction with the preferred embodiment of the invention.
Figure 3B:
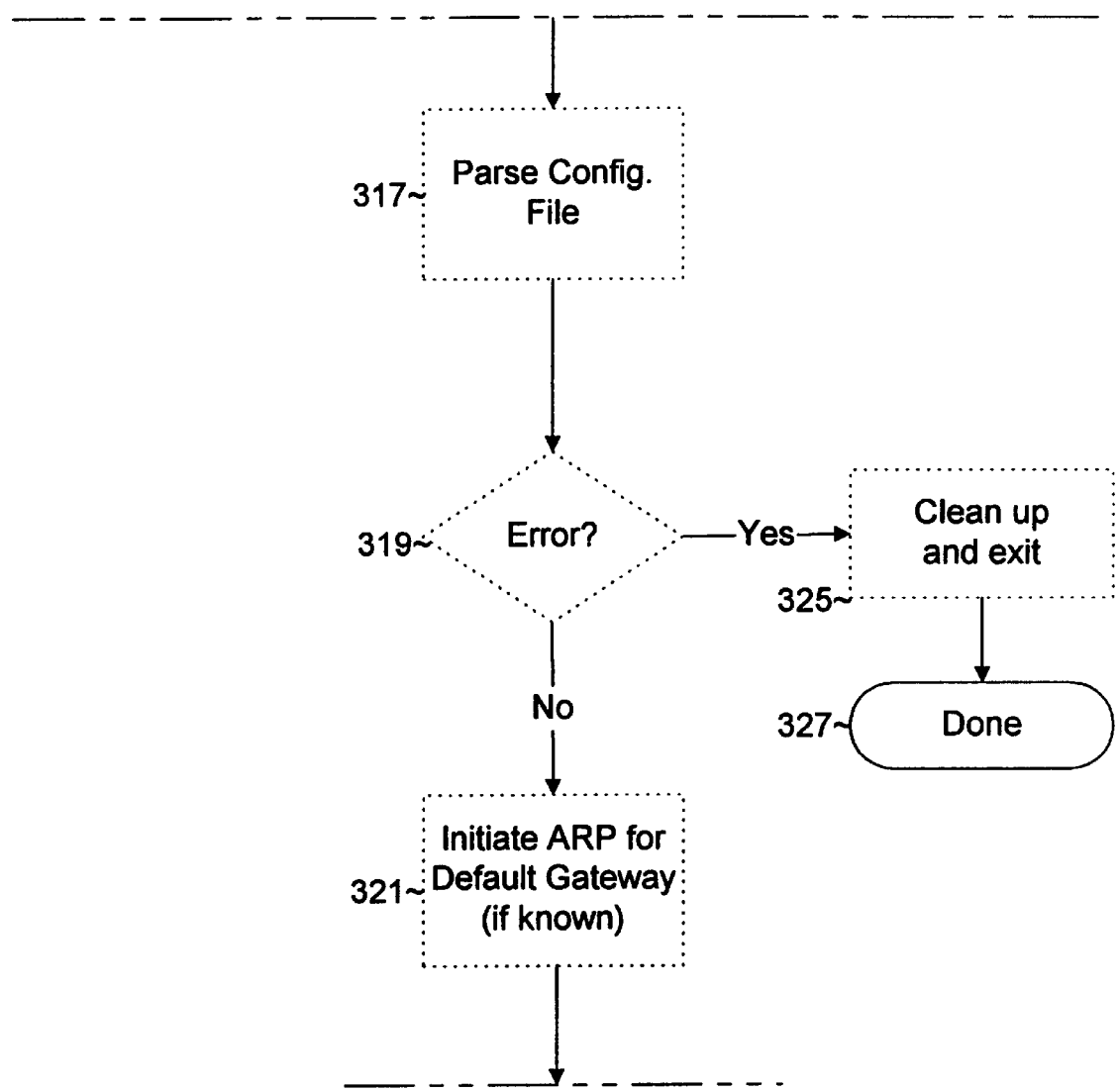
Figure 3D:
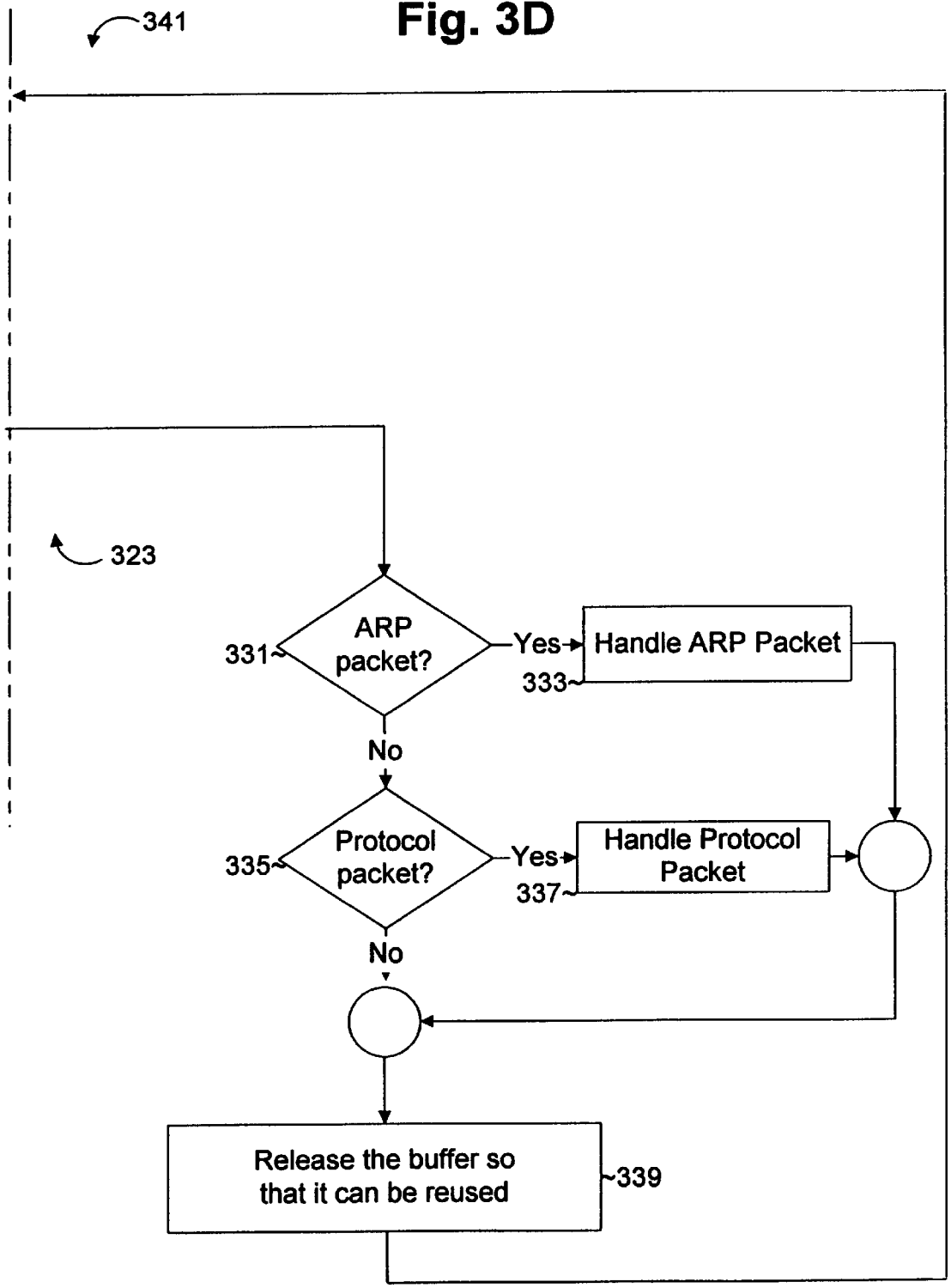

In the preferred embodiment, the functional blocks of the local controller and the remote controller discussed previously herein are each embodied in a respective general purpose computer running software as described in the following flow charts and data structures as will be discussed herein. Starting with the flowchart of FIG. 3A, the software procedure begins at Block 301. Block 303 is the initialization of Tracing & Logging Flags and Global Storage & Buffers. The code scans for all of the packet drivers that might be included as configuration items. There might be one, or there might be up to five. So it is scanned to see how many of them are installed and finding the means for calling them, called handles; passing the addresses for packet-receivers and set each interface into Promiscuous Mode. Then there's a check to make sure that at least one packet driver was found. If none, then it was not set up right so that's there's a clean up and an exit. The "Done" means the program is done.

In Block 311, there's a check to see if more than one packet driver was found. If only one was found, then the Operating Mode becomes that of the local controller, as shown in Block 313. Otherwise, the Operating Mode becomes that of a remote controller shown in Block 315. Those are mutually exclusive so that by Block 317 the Operating Mode has been set to either remote controller or local controller.

Then the program reads through the Configuration File in Block 317. Block 317 is a simple parsing. It reads through an ASCII file, detects if a key word matches certain strings it is looking for, then takes the ASCII for the parameter and stores that value, does a little bit of error checking. As shown in the flowcharts, any box that's in dotted lines is present only in versions of the code for local or remote controllers that have access to a disk. Of course, there would be no point in having code that can read from a disk in a configuration that has no disk.

Moving down to Block 319, the software checks to see if there is any configuration errors in that file. If there were, then in Block 325 there's a clean up and exit. The clean up closes log files, restores the LAN drivers to non-Promiscuous Mode and turns them off so they don't interrupt into code that doesn't exist anymore.

Figure 5B:
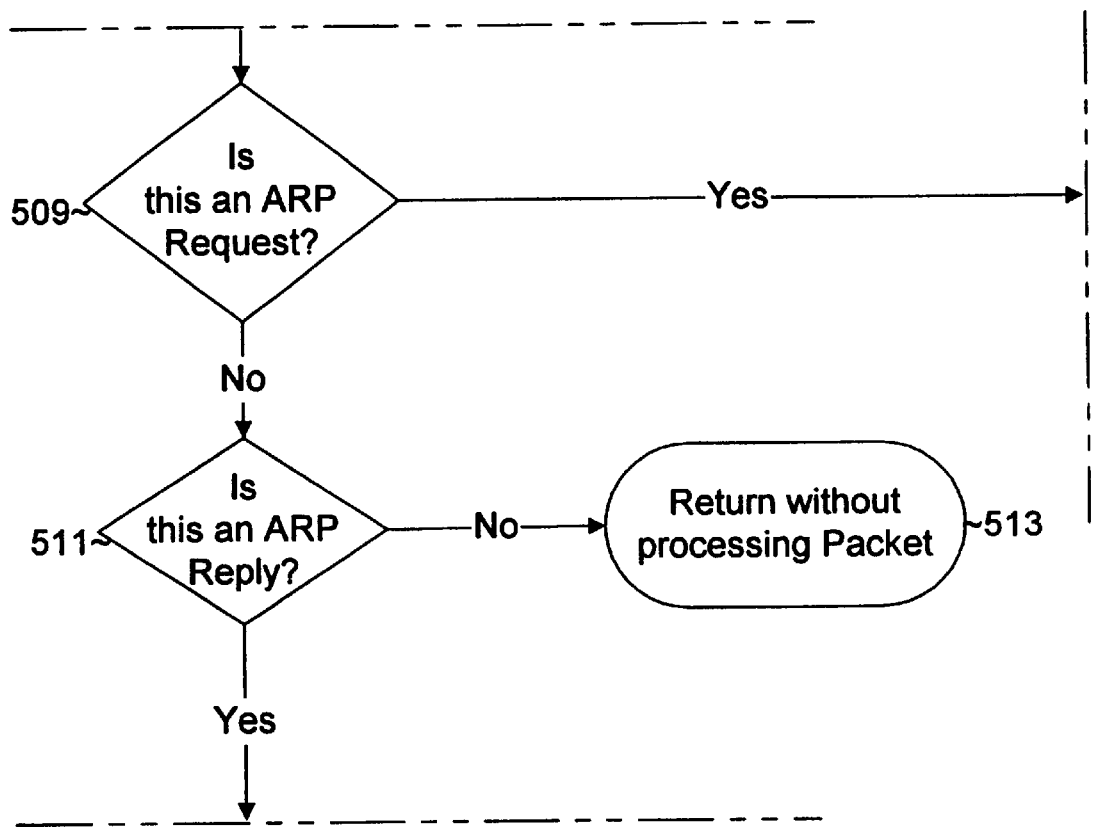
Figure 5D:
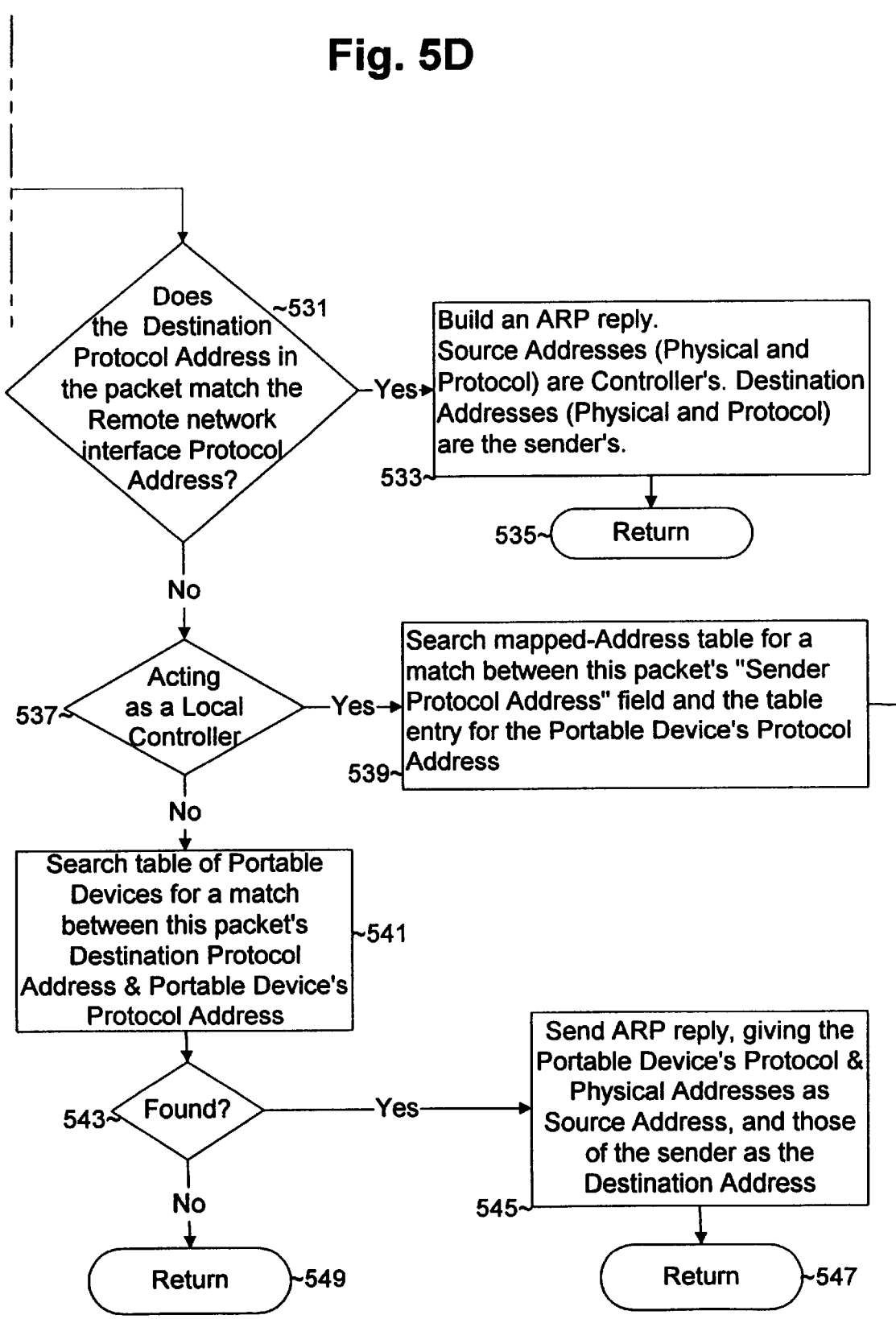
Figure 5E:
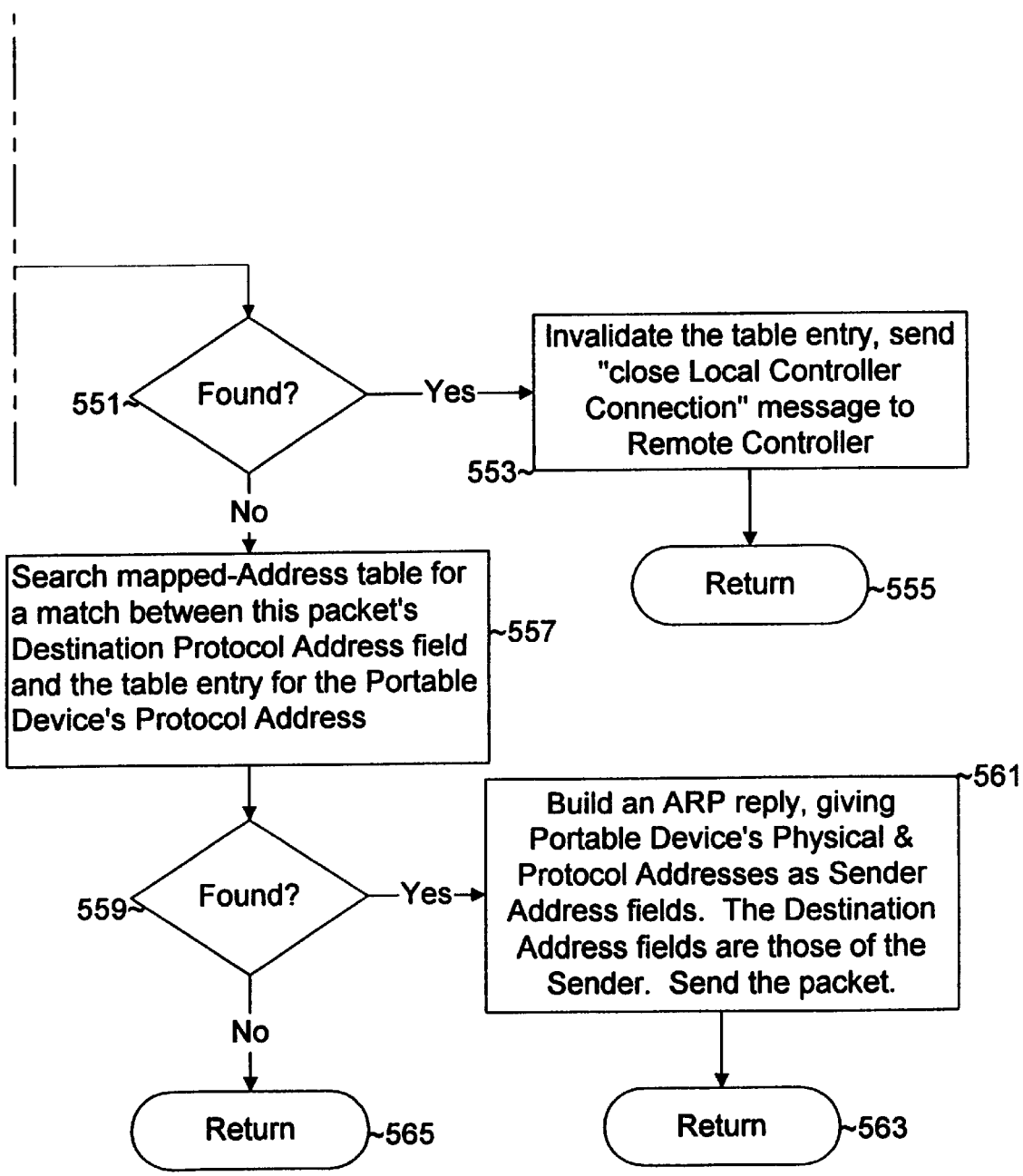

If there were no configuration errors, the execution of the software moves from Block 319 to Block 321, it's going to initiate an ARP (Address Resolution Protocol) used to find the Physical Address for the default network gateway. Execution of the software then enters the main loop at Block 323 for scanning through all of the receiver buffers looking for a buffer that has a packet that has been received. So now moving over to Block 331, the procedure handleReceivedPacket is going to check to see if this packet is an ARP Packet. If it is, then it calls the procedure handleARPPacket in Block 333 and is described in FIG. 5A, starting at Block 501, as will be discussed subsequently herein. If it's not an ARP Packet, then it's tested to see if it's a preferred protocol packet. For example, in the preferred embodiment this is an IP Packet. If the packet is an IP packet, then procedure handleIPPacket is called in Block 337. If it's not an IP Packet and if it's not an ARP, they all come back down to releasing the buffer, that's in Block 339. It releases the buffer so it can be reused and then the procedure returns.

Now moving on to Block 343. There's a check to see if any key on the keyboard has been pressed. If so, this is the signal to terminate the running of the program. Some statistics are printed and then the clean up and exit routine is called and then the whole program exits. The clean up and exit is Block 347 and then the exit is Block 349. If no key has been pressed at a console of the controller, then some housekeeping functions are done. The execution of the software looks for a disconnected portable device by sending ARPs to any the portable devices which haven't sent packets in the last 60 seconds. Those which haven't responded to these ARPs in the last 4 minutes are deemed to have been disconnected and moved away (by their owners). It should be understood that execution of the software provides some time for dropped packets on some of them but they have to answer at least one of them in 4 minutes). If so the resources that they use in the tables are released, as shown in Block 351.

After that, execution of the software sends Controller Advertisements at approximately 61-second intervals. Controller Advertisements are messages that are sent out on the remote network so that when a portable device is plugged in to its local network, it realizes that it's back on the local network and any remote or local controller connections can be released.

Execution of the software sends BOOTP broadcasts, but this is only done if the site Protocol Address is not yet determined. There's a feature in the software that provides for configuration without the Protocol Address using BOOTP, as in Block 355, then execution of the software returns back to the main loop.

Speaking now of FIG. 4A that handles Receiver 0. There's also a Receiver 1 and Receiver 2, a Receiver 3 and a Receiver 4. There's a separate procedure for each network card. Everything about how they operate is the same except for which number they put in on the "receive from" part of the data structure. This is so that the rest of the code can determine if this packet came from a portable device or if came from the remote network. In the code there are receivers 0 through 4 but the operation of them is completely identical, with the single exception that when a packet is received there is a data structure that says how many bytes are in it and that it's busy, and there is another place where it says which interface card got it. So that when a packet is returned from that portable device, the software recognizes which one to send it to. Elsewhere in the code, some of the processing is different depending on whether it came from any portable device or whether it came from the remote network.

Figure 4B:
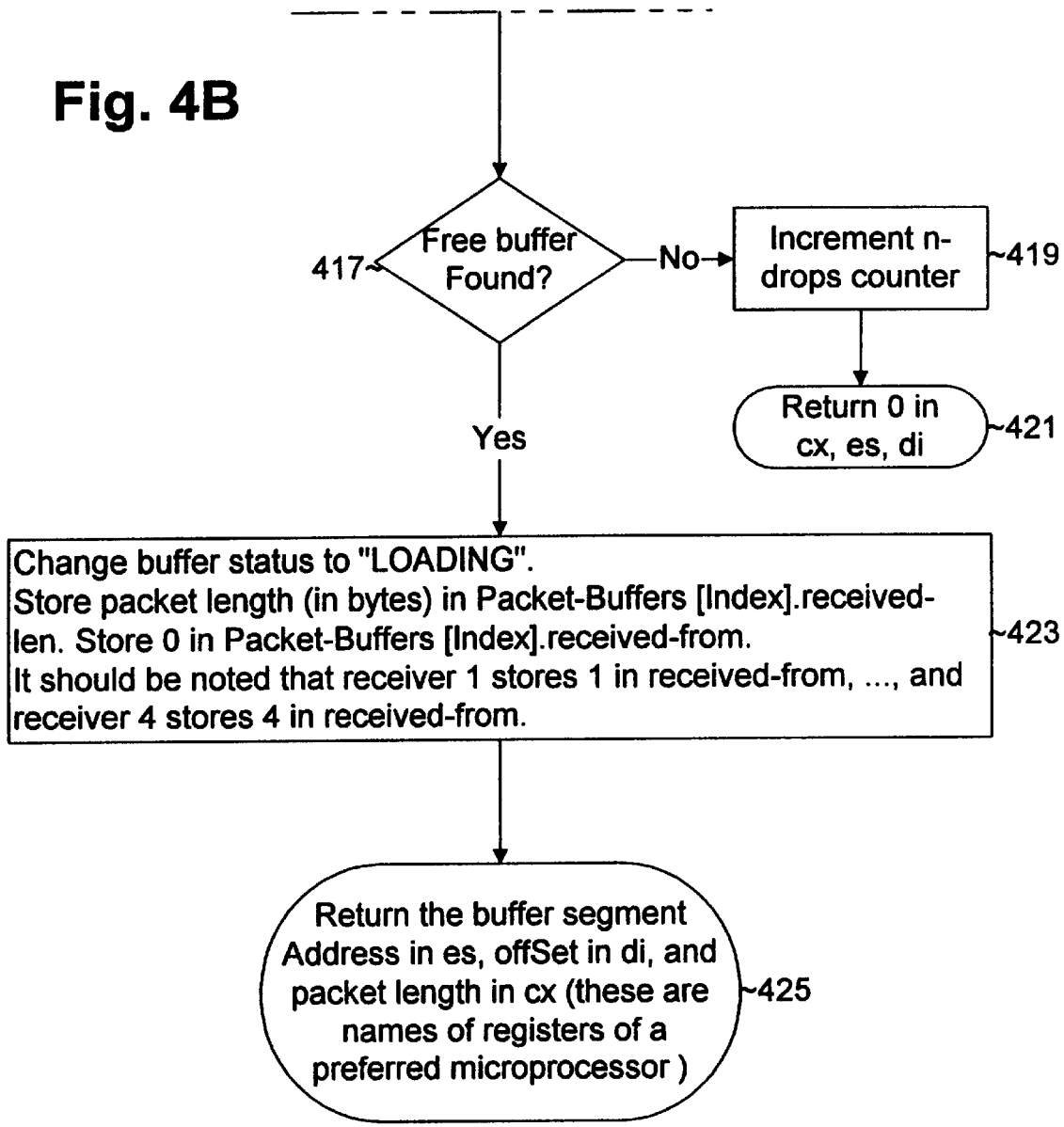
Figure 4C:
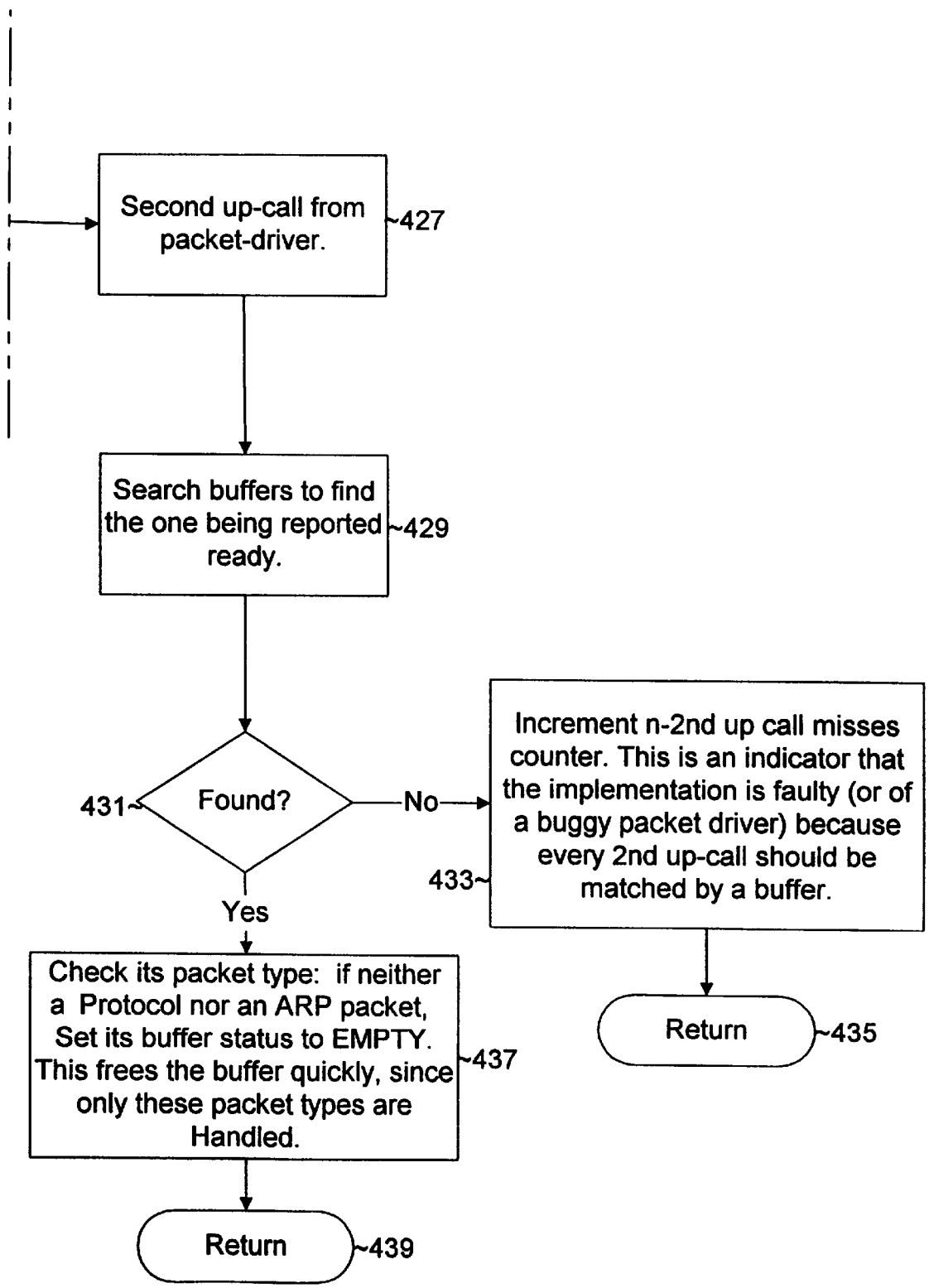

The process of receiving packets happens asynchronously and is described in the flowcharts of FIGS. 4A, 4B and 4C. If a packet has been found, then the procedure (called handleReceivedPacket) goes back to the loop to scan for more buffers. Starting at Block 401 Receiver 0 Start, the first thing that happens is that the interrupts on the controller are disabled. That's Block 403. Now a check is made. This interface that we're talking about, this is a software interface, to packet drivers. A value in a register that determines whether it's the first time being called or the second time. The first time means that there is a packet that's coming in, and a buffer address is needed to provide for storage for the incoming packet. The second up-call is the signal to the software that the packet has been received and is now in memory. So, Block 405 is the test to see if it's a first up-call.

Block 407 is for that case (the first up-call). The check is made to see if the packet is too big. If it's bigger than 1518 bytes, it's too big to be a legal Physical packet and that's also sometimes referred to as a Jabber. If it is, then in Block 409 execution of the software increments the statistic counter for the number of Jabbers that have been seen. This is sometimes useful in trouble-shooting. If the packet driver interface says to ignore this packet, then execution of the software returns with a 0 in the registers cx, es and di, as in Block 401. Assuming it's not a Jabber, execution of the software goes to Block 413. Execution of the software increments the number of packets received counter.

Then in Block 415, execution of the software finds the next available buffer that is empty. The software uses a global variable to hold the most-recently-used buffer index. Accordingly, execution of the software doesn't keep reusing the same ones. Execution of the software spreads things out, so as to find an available buffer in an efficient amount of time.

Moving on to Block 417. If no buffer was found, execution of the software moves over to Block 419. Execution of the software increments the number of drops counter. If there is no place to put this packet, then execution of the software ignores it in Block 421. If a buffer is available, then in Block 423 execution of the software changes the buffer status to loading, stores the packet length in bytes. In the Packet-Buffers array the field is called Received_len. Execution of the software stores 0 in the Packet Ready Buffer. The order of these two is to ensure that in execution of the software there are no race conditions between the code that happens here in FIGS. 4A through 4C that's happening asynchronously and on an interrupt basis, and code near the top half of the kernel, which is looking for buffers. The software ensures that a buffer is available before the packet is completely loaded into that buffer.

Then at Block 425, execution of the software returns the buffer segment Address in the es register, the offset in the di register, the packet length in the cx register. These are all names of registers in a preferred embodiment, which uses an Intel microprocessor.

In the second up-call in Block 427 the packet is ready to be received. Execution of the software searches the buffers to find the one that's being reported ready, in Block 429. In Block 431 execution of the software checks to see if one was found. If not, in Block 433 increment the counter for the second-up-call misses. That's an indicator that the implementation is faulty, or of a buggy packet driver because every second-up-call should be matched by a buffer. Then the procedure would return in Block 435.

Finding one in Block 437, execution of the software checks its packet type. If it is not an ARP packet and it's not an IP Protocol packet, then execution of the software puts the buffer status to EMPTY. This is an optimization. It helps to cycle the buffers through a lot more quickly because there are a lot of other types of packets that can be received on the network that the software doesn't do anything with, and would ignore. So the sooner those packets get recycled, the better. Then the procedure returns in Block 439.

In the flowcharts of FIG. 5, start of the procedure of handleARPpacket begins in Block 501. In Block 503 execution of the software performs a test for the Protocol Address of the site Network. That would come in from either BOOTP responses from the broadcast or from the parsing of the ASCII text file. As provided in Block 505 if the Protocol Address of the remote network is not yet determined, execution of the software returns without processing the packet. If the remote network Network Protocol Address is determined in Block 507, execution of the software copies the-sender destination's Protocol Address.

Block 509 determines if this is an ARP Request. If it is not, then execution of the software checks to see if it is an ARP reply. If it's not that, there are other ARP or RARP combinations that it could be. In Block 513 execution of the software returns without processing the packet.

At Block 515, the packet is an ARP Request. Execution of the software checks to see did it come from one of the network interfaces of the portable devices. If it did, then execution of the software checks to see if the portable device is ARP'ing for itself. On boot up they do that. If that's the case, then in Block 519 execution of the software returns without processing the packet. If execution of the software answers that ARP, then the portable device would operate as if some other machine on the network had its Protocol Address and it would stop talking on the Network and provide an error message saying some other device its Protocol Address.

Moving on to Block 521, execution of the software searches for the portable device table for an entry whose Protocol Address matches the sender's. In Block 523 execution of the software checks to see if this was found. If not, in Block 525 execution of the software creates a new entry in the table. The Entry's time-first-used is timeNow, which is used for some of the management protocol messages.

Block 527 converges Blocks 523 and 525, since either of those two end up in Block 527. Execution of the software copies the current time into the Entry's time-of-last-use field and also into the time-last-received field. These are used to check for portable devices that have been disconnected. There's no point in sending ARPs to portable devices that are already sending packets to the controller, because receiving packets from them determines they are still there.

Execution of the software increments the packet and byte counters for the entry. That's used for some management for tracking how much use the portable device is making of the Network. Execution of the software copies the sender's Protocol Address and Physical Address into the table entry, and builds an ARP-response packet. The sender address is the controller's, destination Address is the portable devices (meaning both Protocol and Physical Address). So now the ARP Request from the portable device is then as a response back to the portable device and the procedure returns in Block 529.

In Block 531, this is an ARP request from remote network, not from one of the portables. So, the test is, does the destination Protocol Address in the packet match the remote network interface Protocol Address? If it does, then execution of the software builds an ARP reply. In Block 533 execution of the software builds an ARP reply. Both of these source Addresses, meaning the Physical MAC Address and the network level Protocol Address, are that of the Controller. Both destination Addresses, again Protocol and physical, are the sender's. In Block 537, this is an ARP Request from the remote network and it does not match the Network interface of the Protocol Address of the remote network interface. So now execution of the software determines whether the operating mode is that of a Local Controller. If it is, then execution of the software searches the record of the map-Address table for a match between this packet's sender network level Protocol Address field and the table entry's portable device Protocol Address, as in Block 539.

If the general purpose computer is not acting as a Local Controller, then in Block 541 execution of the software searches the portable device table for a match between this packet's destination Protocol Address and the portable device Protocol Address. In Block 543 execution of the software checks to see if this was found. If yes, the software sends an ARP reply giving the portable device's Protocol and Physical Address as the source Address, and the sender's as the destination Address. In Block 547 execution of the software returns. In Block 549 execution of the software did not recognize a match so there is a return. If execution of the software found a match in that search, that's labeled "yes" in FIG. 5E by Block 553. Then in Block 553, execution of the software invalidates the table entry, send a "close Remote/Local controller connection message" to the Remote Controller and then in Block 555 execution of the software returns. If execution of the software didn't find one, then in Block 557 execution of the software searches the mapped-Address table for a match between this packet's destination Protocol Address field and the table entry's portable device Protocol Address.

In Block 559 execution of the software rechecks to see if one is found. If one is found, execution of the software builds an ARP reply, giving the portable device's Physical and Protocol Addresses as sender Address fields, and the destination Address fields are those of the sender, and execution of the software sends the packet back in Block 561 and returns in Block 563. If one is not found in Block 559, then execution of the software returns in Block 565.

Figure 5F:
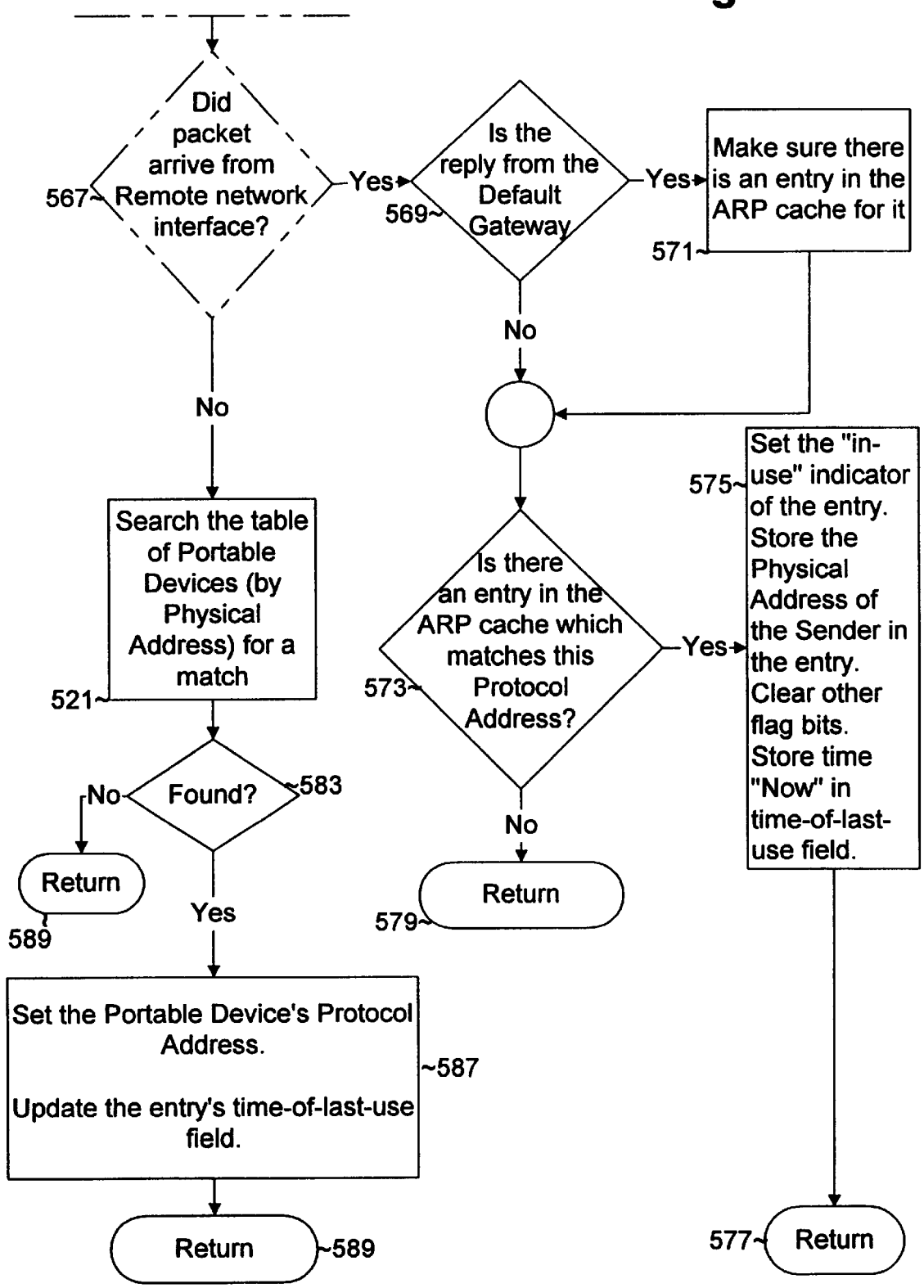

In FIG. 5F Block 567, execution of the software checks if the packet arrived from the remote network interface. In other words, it came from the remote network. In Block 569, if it did come from the remote network, execution of the software determines whether the reply is from the default gateway. If it did come from the default gateway in Block 571, execution of the software ensures that there is an entry in the ARP cache for the default gateway. In other words, the controller just got a packet from the default gateway, so its Protocol Address is known. Since its Physical Address is known, execution of the software enters it in the ARP cache if it's not already there. Both of those blocks (569 and 571) converged at Block 573, which is a test to see if there's an entry in the ARP cache which matches this Protocol Address.

In Block 575, if the answer to that question is yes, then execution of the software sets the in-use indicator of the entry, stores the Physical Address of the sender in the entry, clears other flag bits of the entry and stores the current time (timeNow is what it's called in the code) in the time-of-last-use field. These time-of-last-use field things are used to make sure that when portable devices are disconnected from the controller, that their table entry resources are automatically cleared out from the controller. In Block 577 execution of the software returns. From Block 573, if the answer was no in Block 579, execution of the software returns and proceeds to Block 581 to search the portable device table by Physical Address for a match to this packet.

In Block 583, execution of the software checks to see if a match to this ARP relply was found. If not, then it is ignored. If execution of the software found a match, then we're going to set the portable device's Protocol Address, update the entry's time-of-last-use field. This is done in Block 587, and in 589 execution of the software returns.

As will be discussed in further detail subsequently herein, the invention includes a novel Controller-to-Controller protocol, which provides an efficient way of setting up data communications between the remote controller and the local controller, and also for maintaining statistics about operation. When the Remote Controller sets up a Remote/Local Controller Connection, it needs to communicate to the Local Controller so that the Local Controller can reserve table space so that it can recognize responses coming back from the portable device's users' servers on the local network, as well as other local devices. In operation those local devices address their response packets back to the portable device's Protocol Address. It will be the Local Controller that will be the place those packets will be Addressed. They will be routed by the normal routers back to that point. So, the Local Controller has to pick them up and has to connect them out to wherever the portable device is. It has to have a table entry that will allow him to recognize those packets and distinguish them from the billions of other packets it is going to see that it ignores.

The other parts of the Controller-to-Controller Protocol, some of them are used for management, for example by gathering statistics on operation. They are sometimes useful if you want to know if an controller is responding, or if it is doing anything. In proper operation, the controller should be incrementing at least some of those statistics. Some of the other statistics can be used for debugging, such as the number of jabbers, the number of drops, and so on. So, if there are some sort of operational problems, statistics provide information as to whether these problems are caused, for example because of packet drops. Alternatively this possibility can be eliminated if those statistics are not being incremented.

Figure 6A:
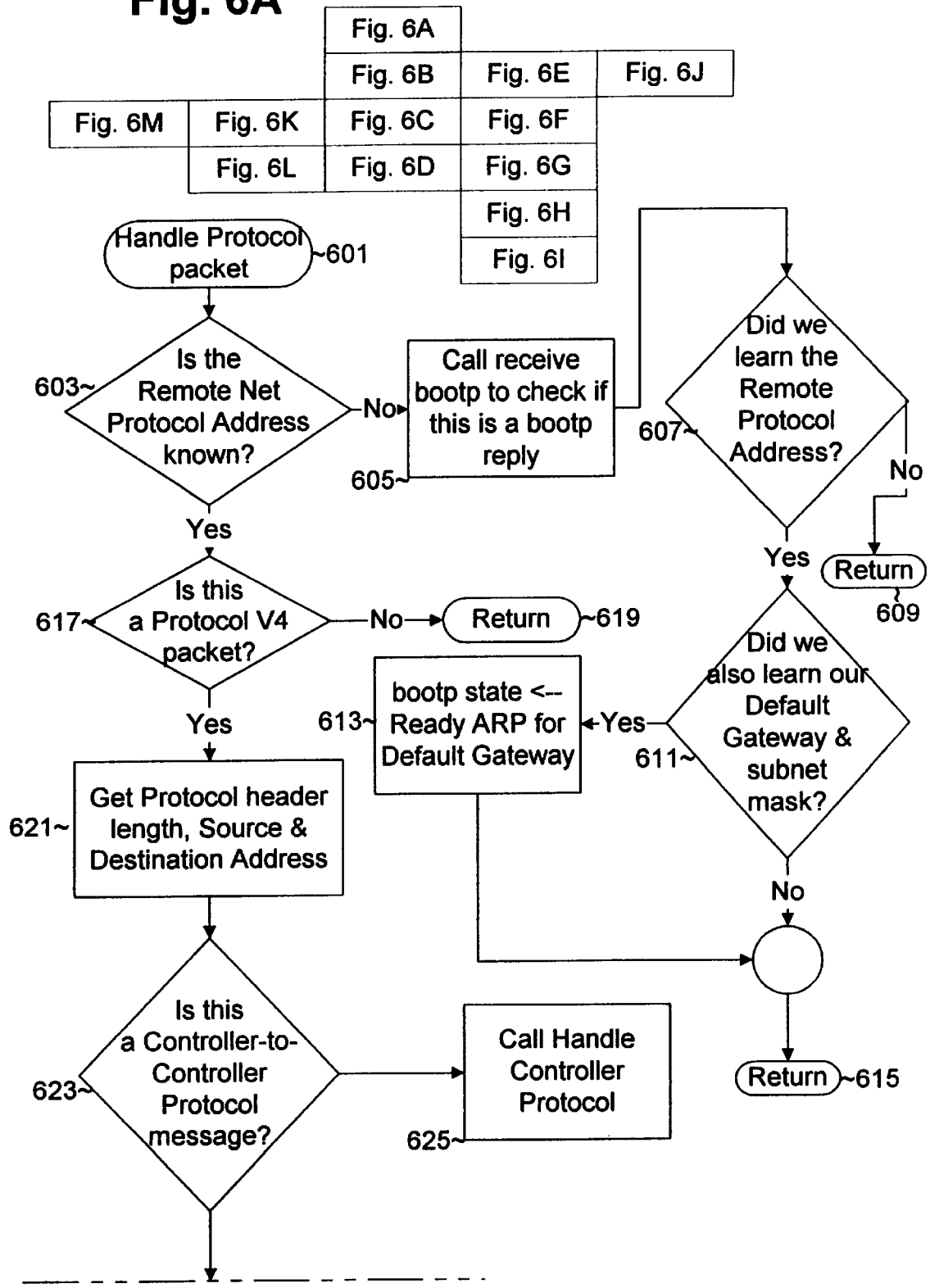
Figure 6B:
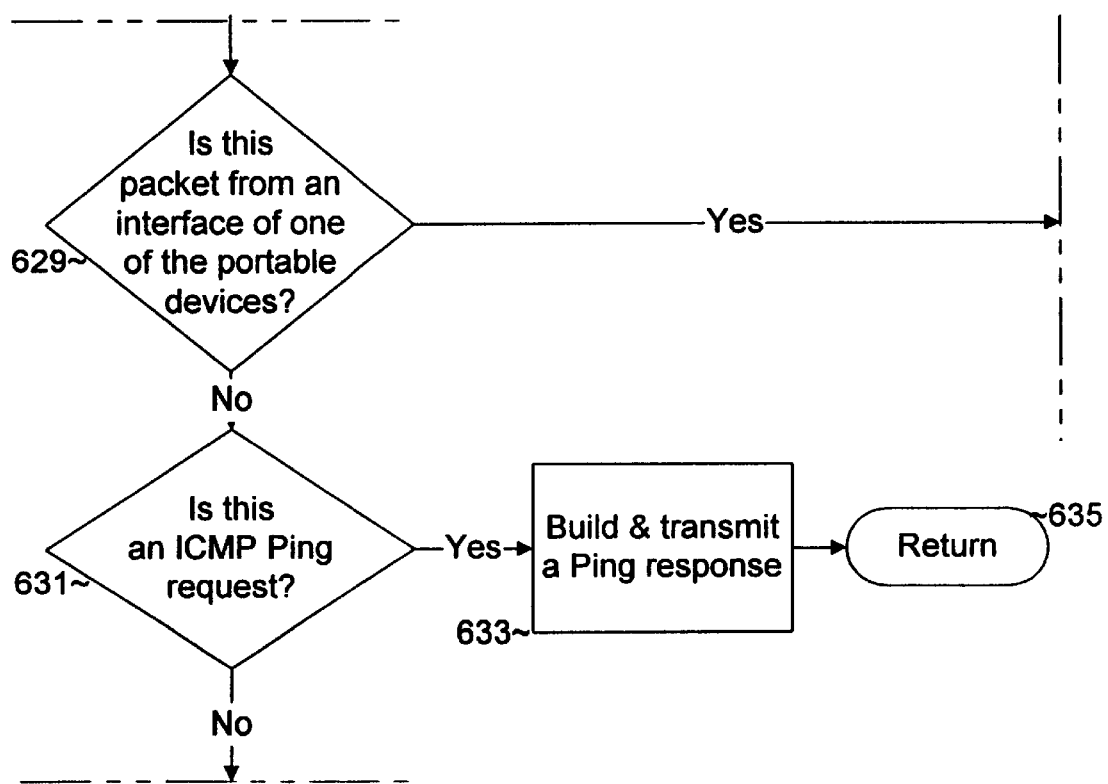
Figure 6D:
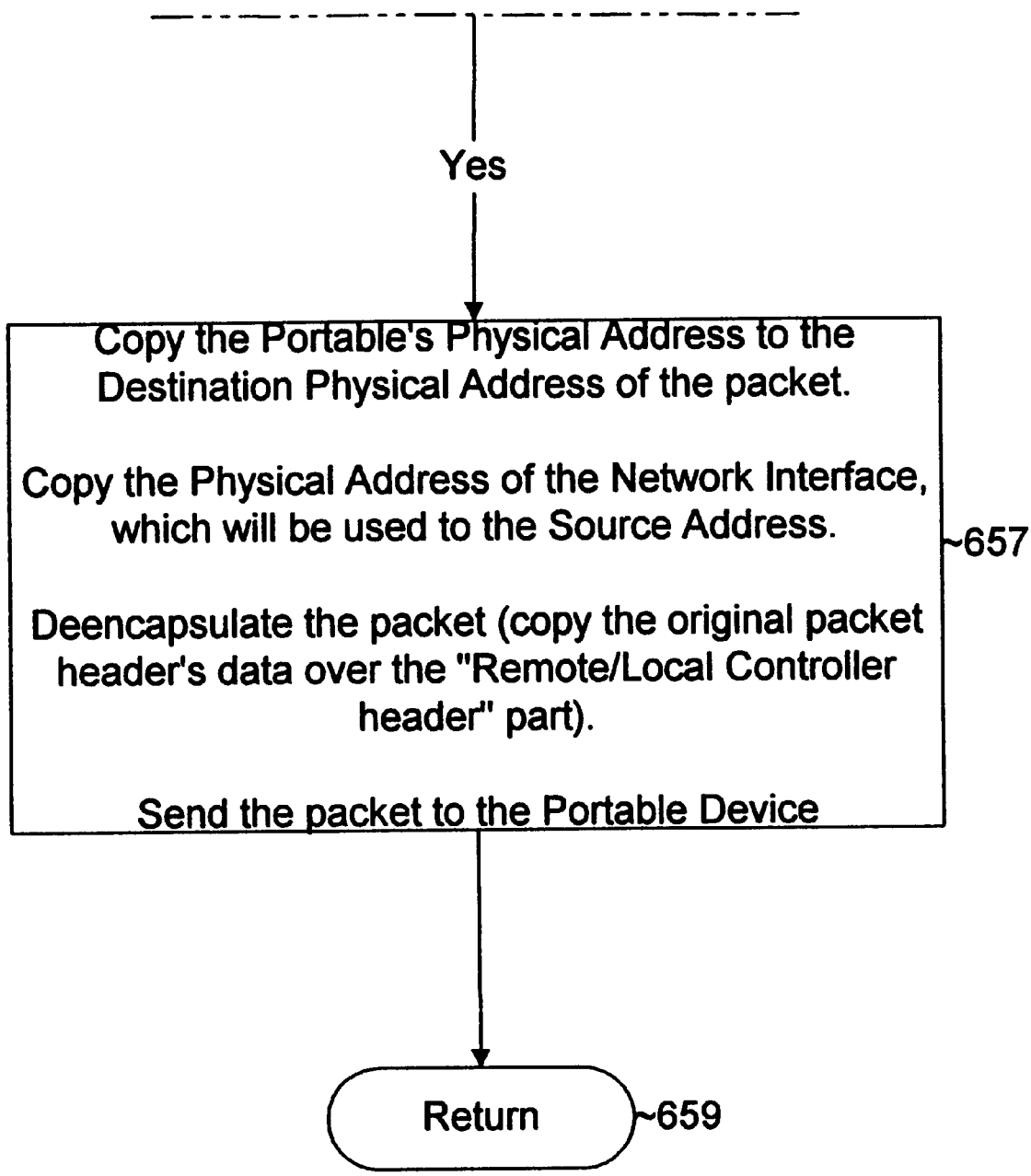
Figure 6E:
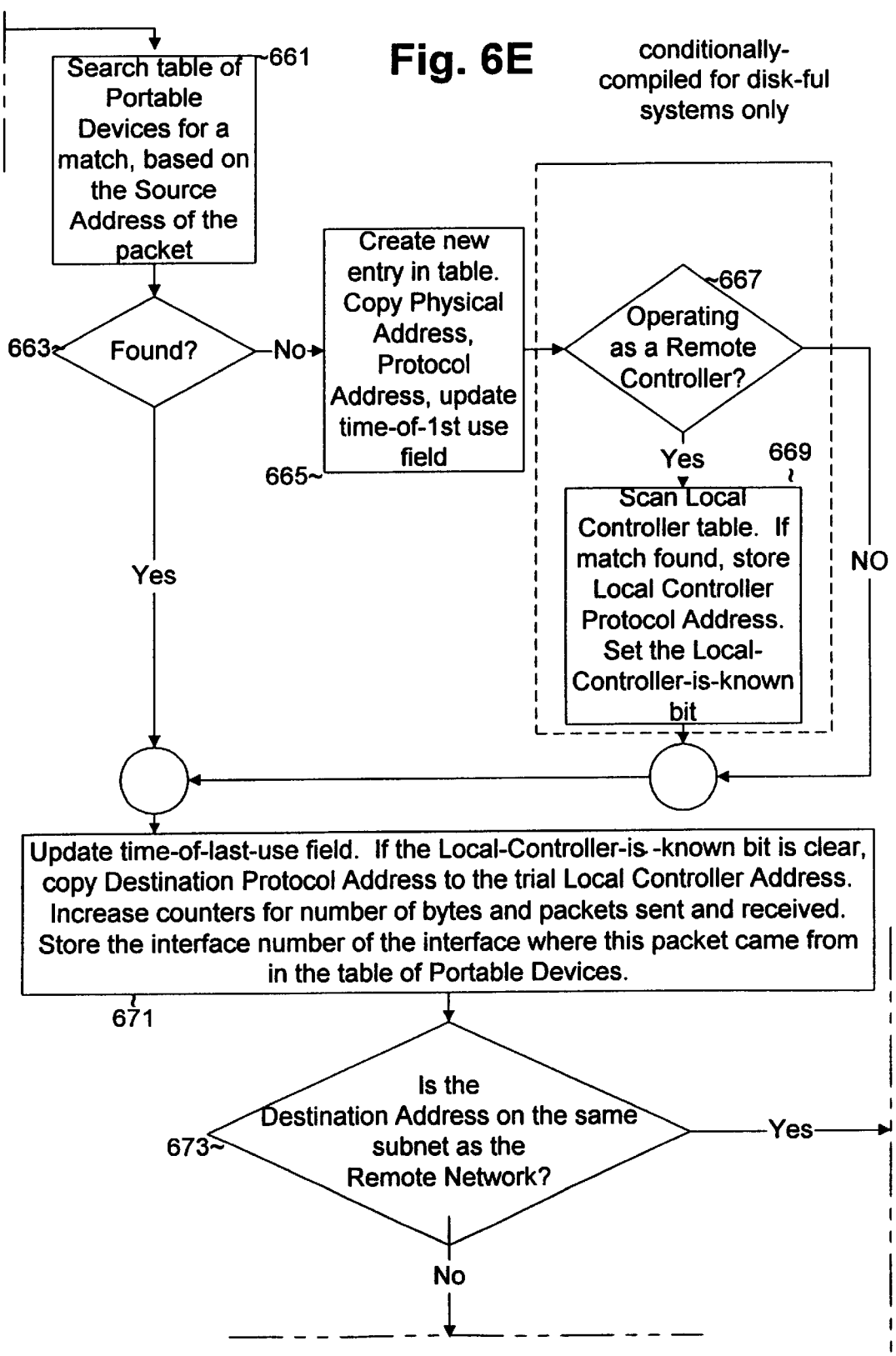
Figure 6F:
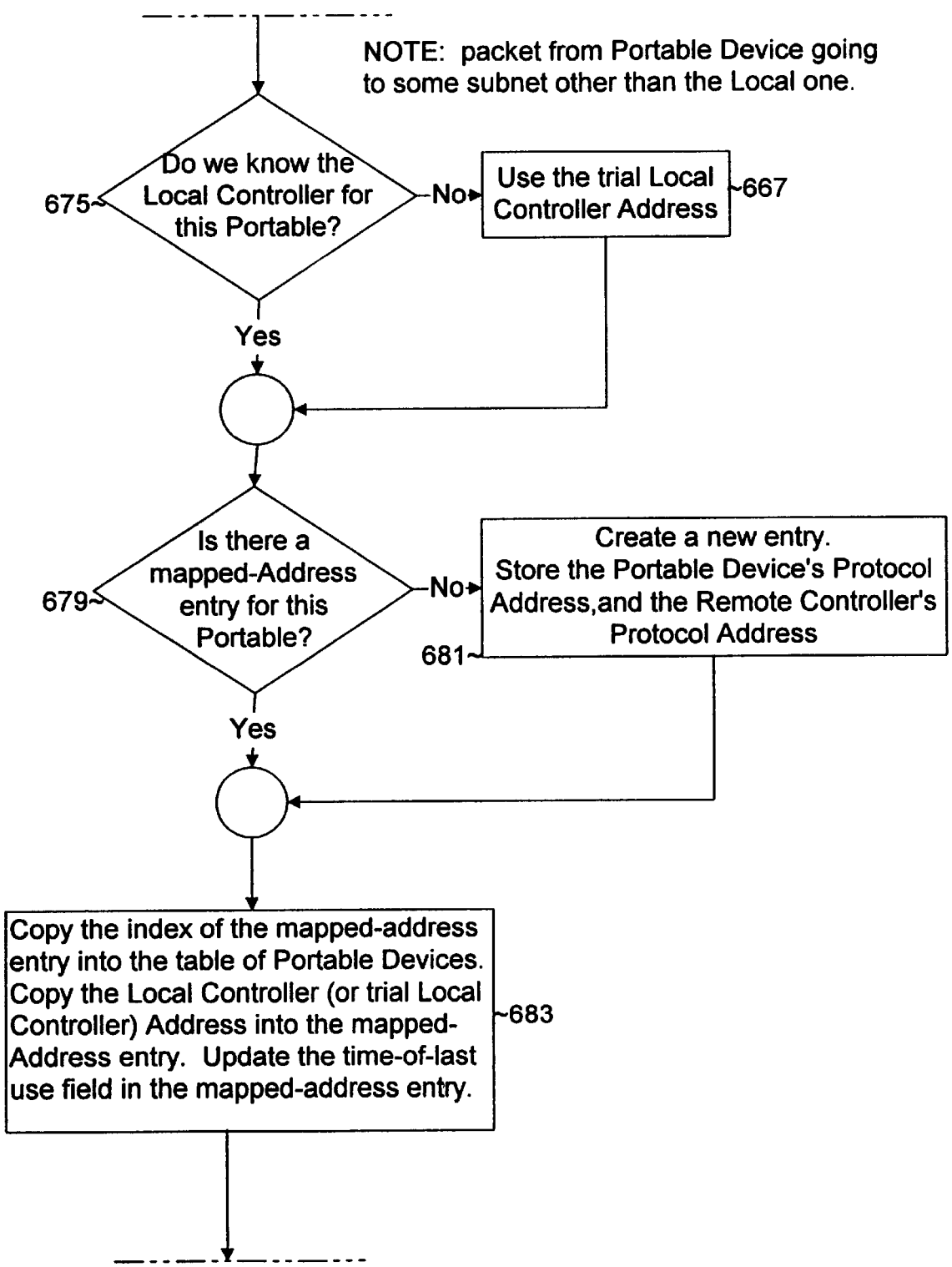
Figure 6G:
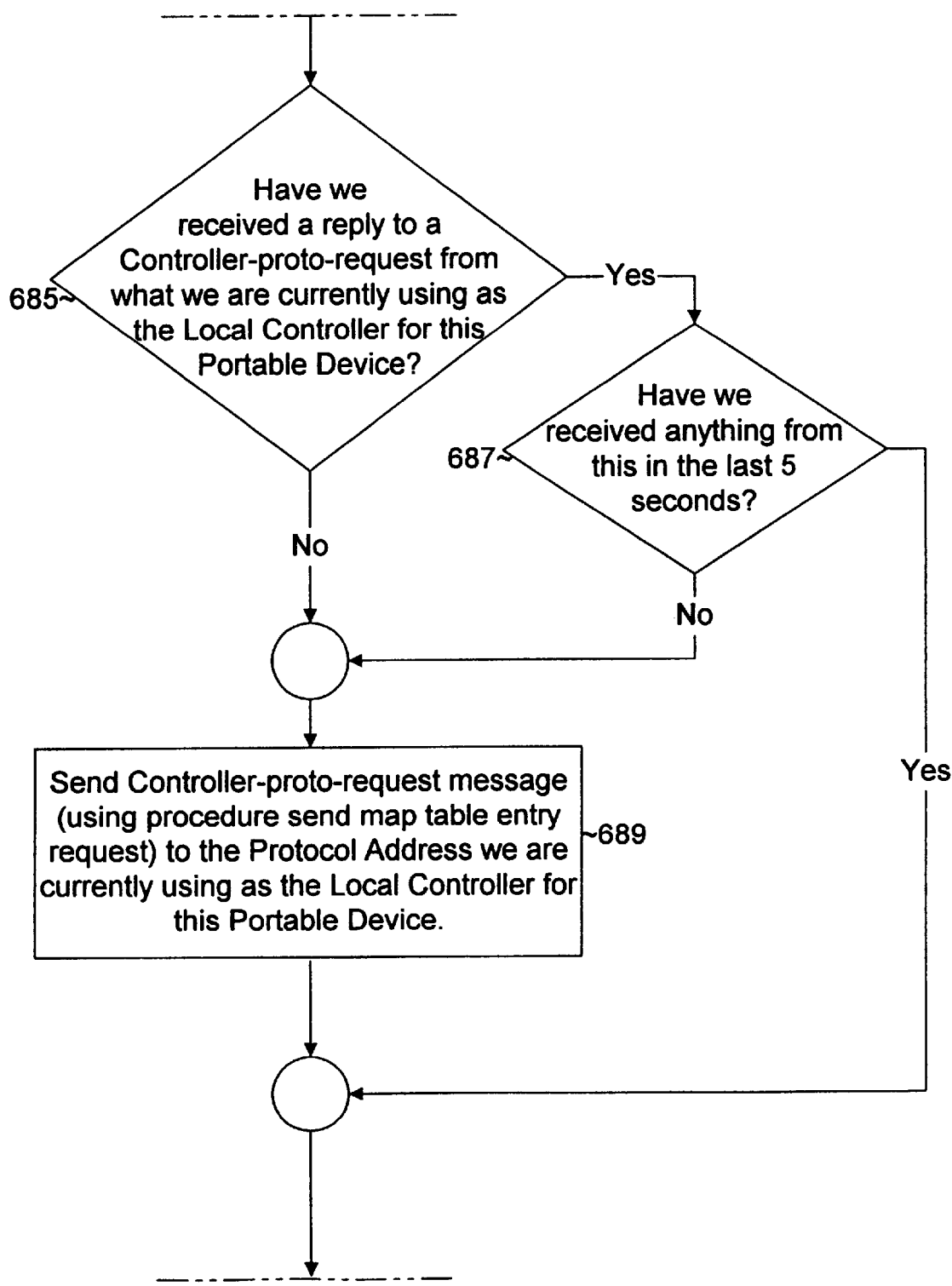
Figure 6H:
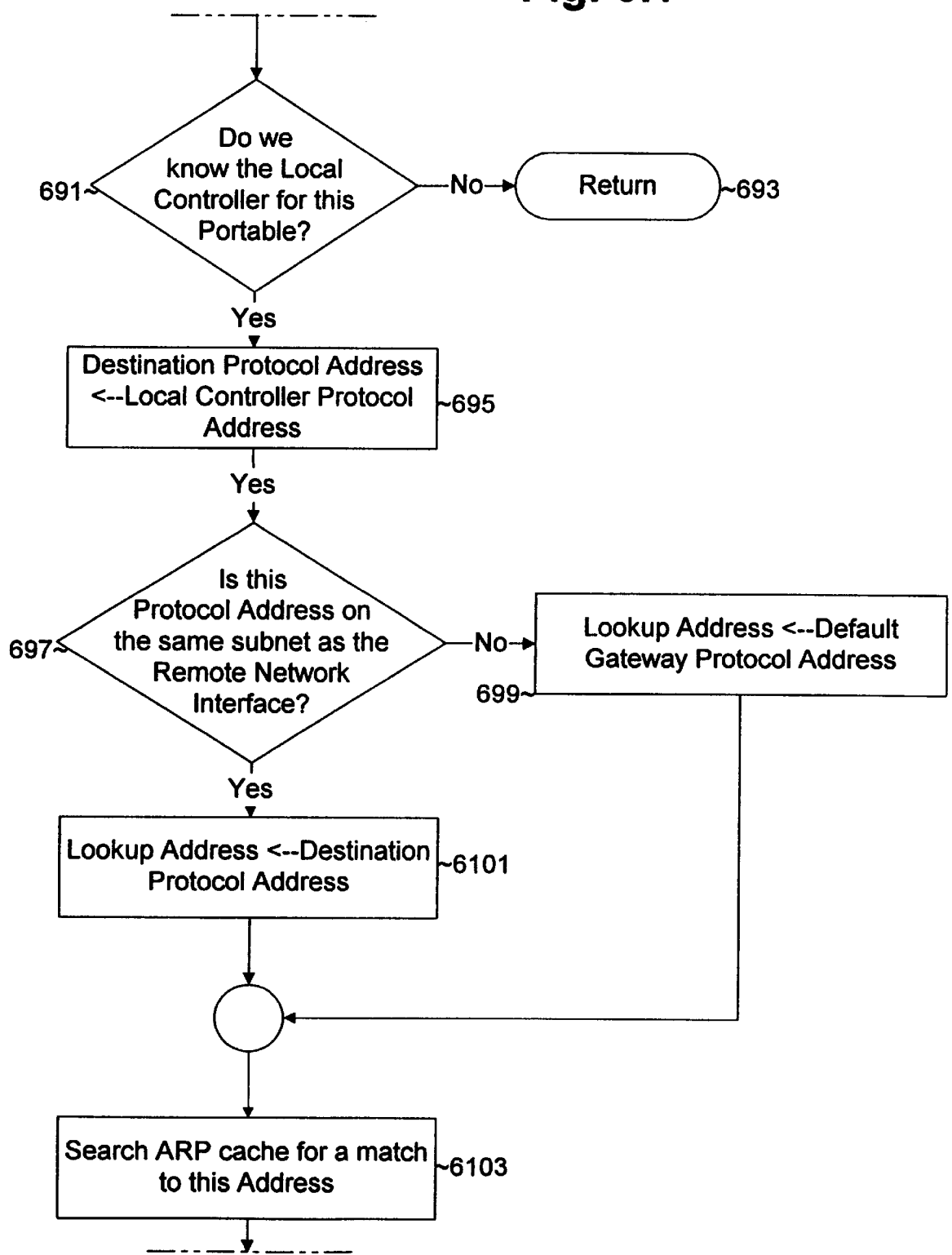
Figure 6I:
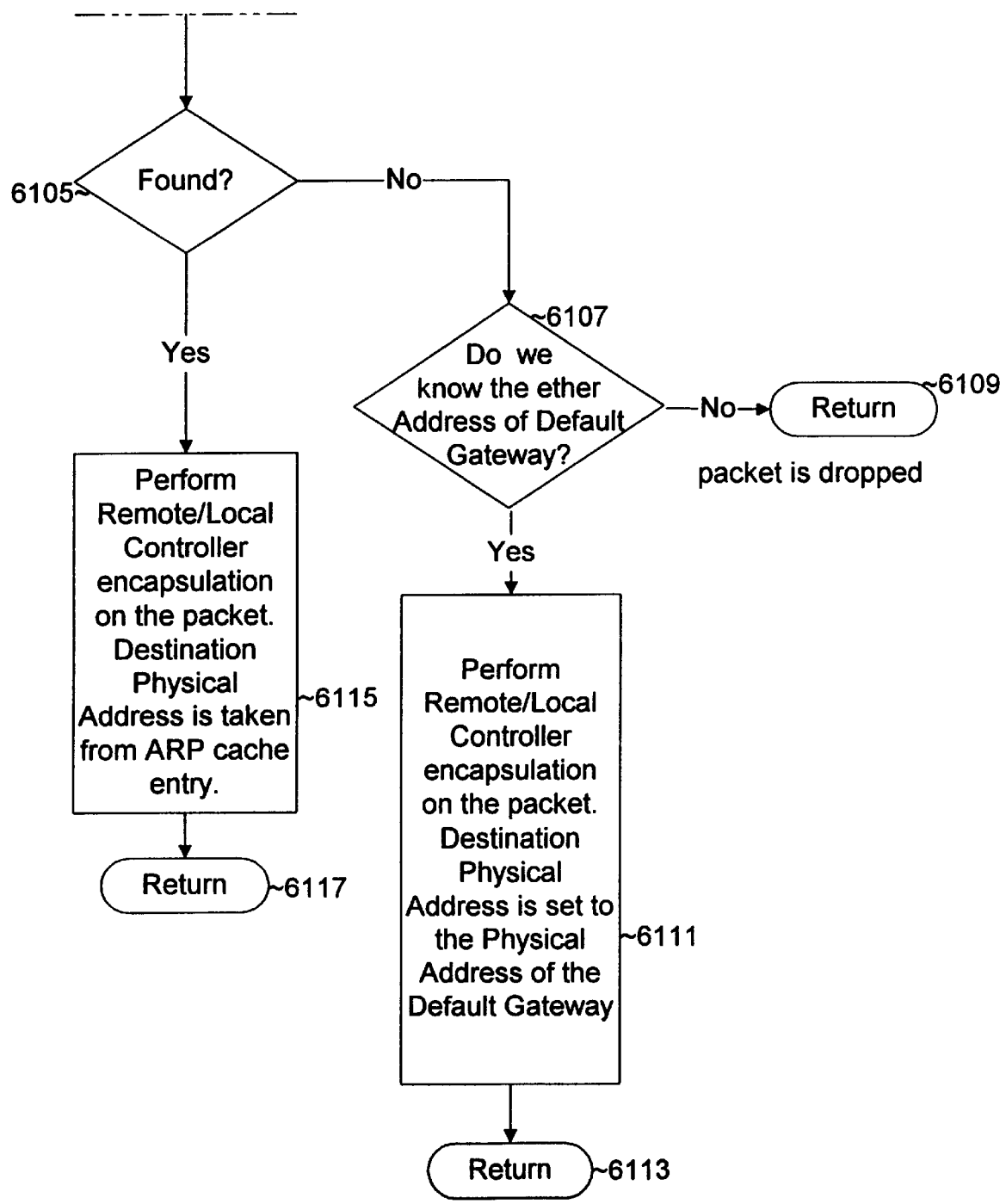
Figure 6J:
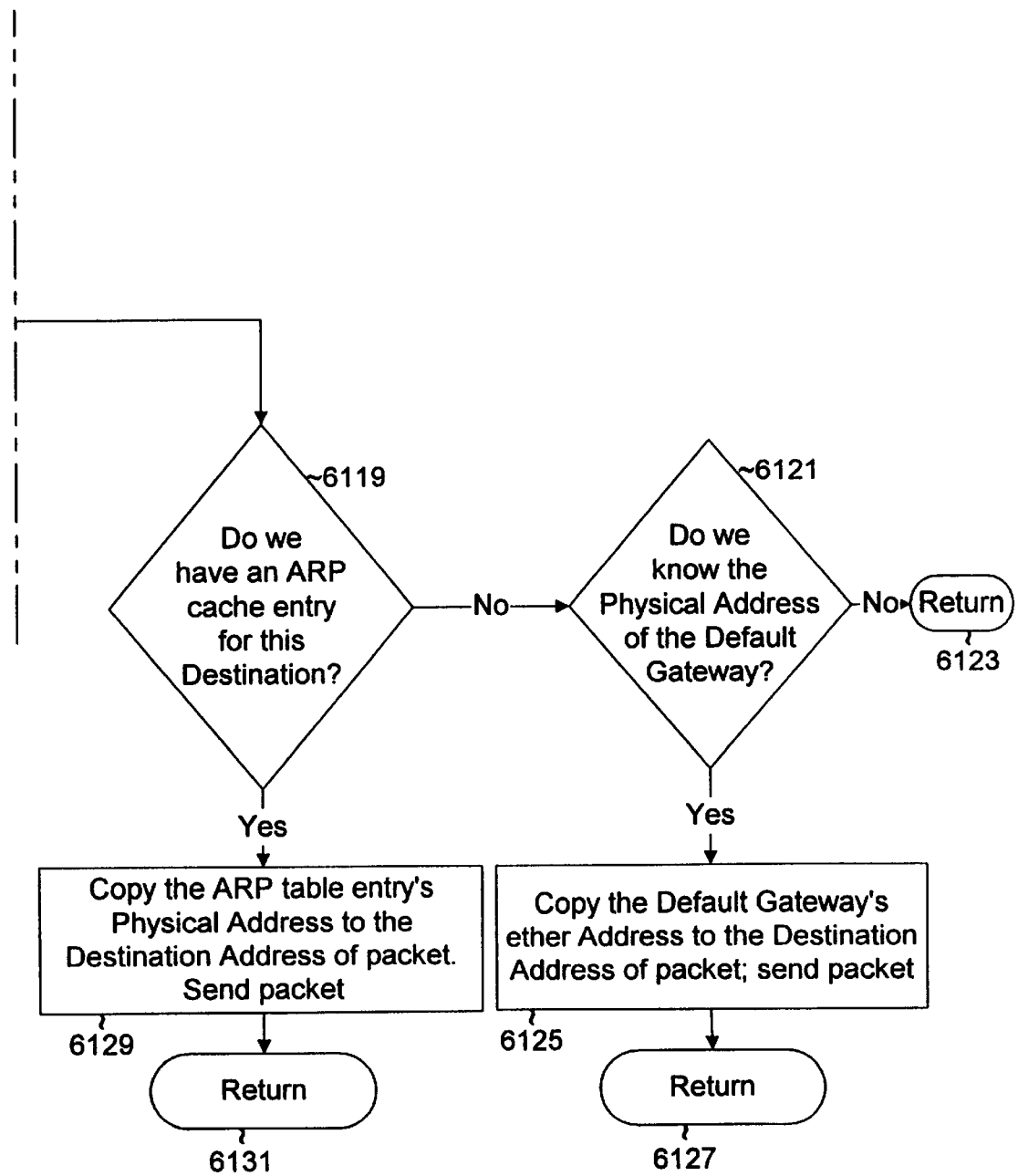
Figure 6K:
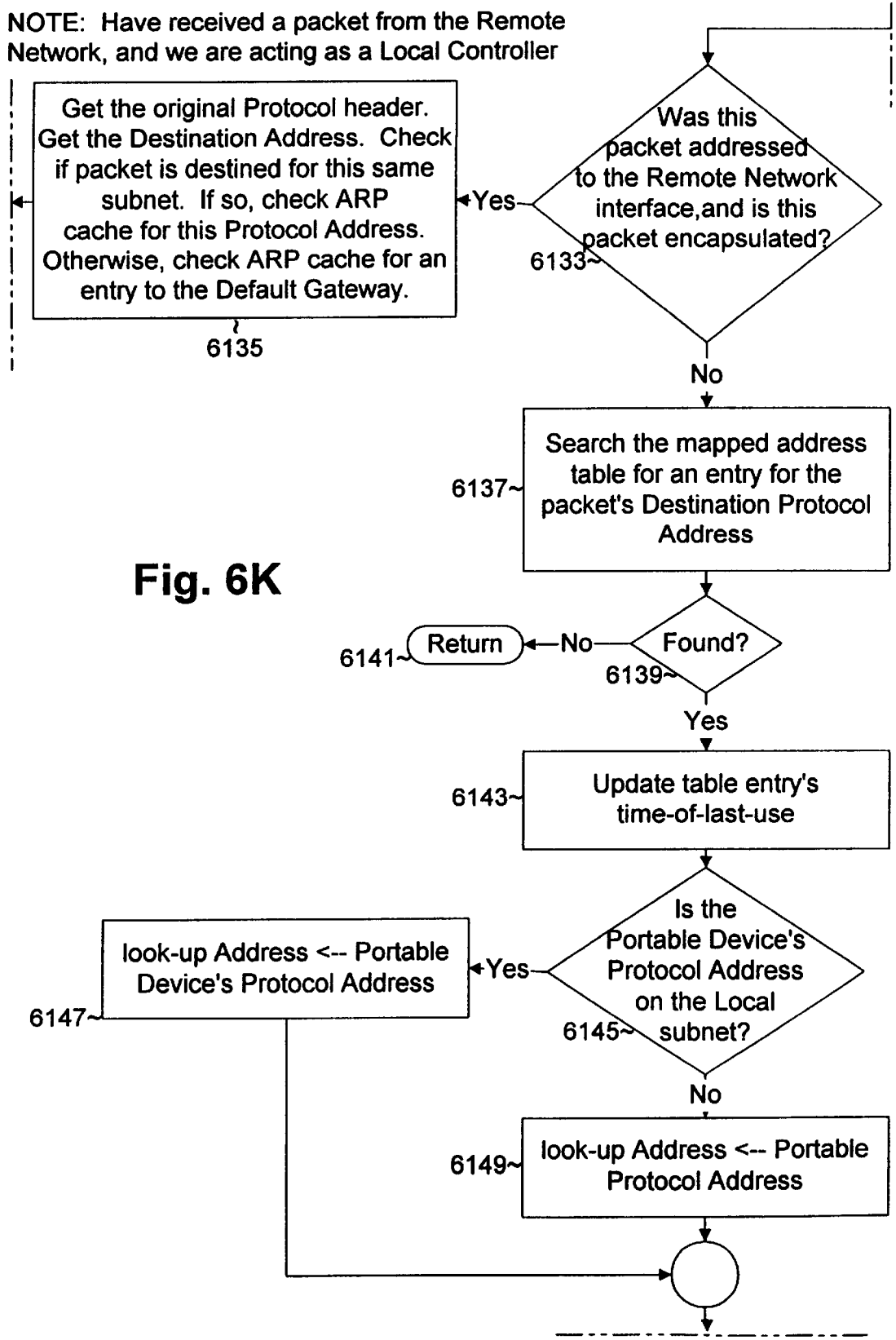
Figure 6L:
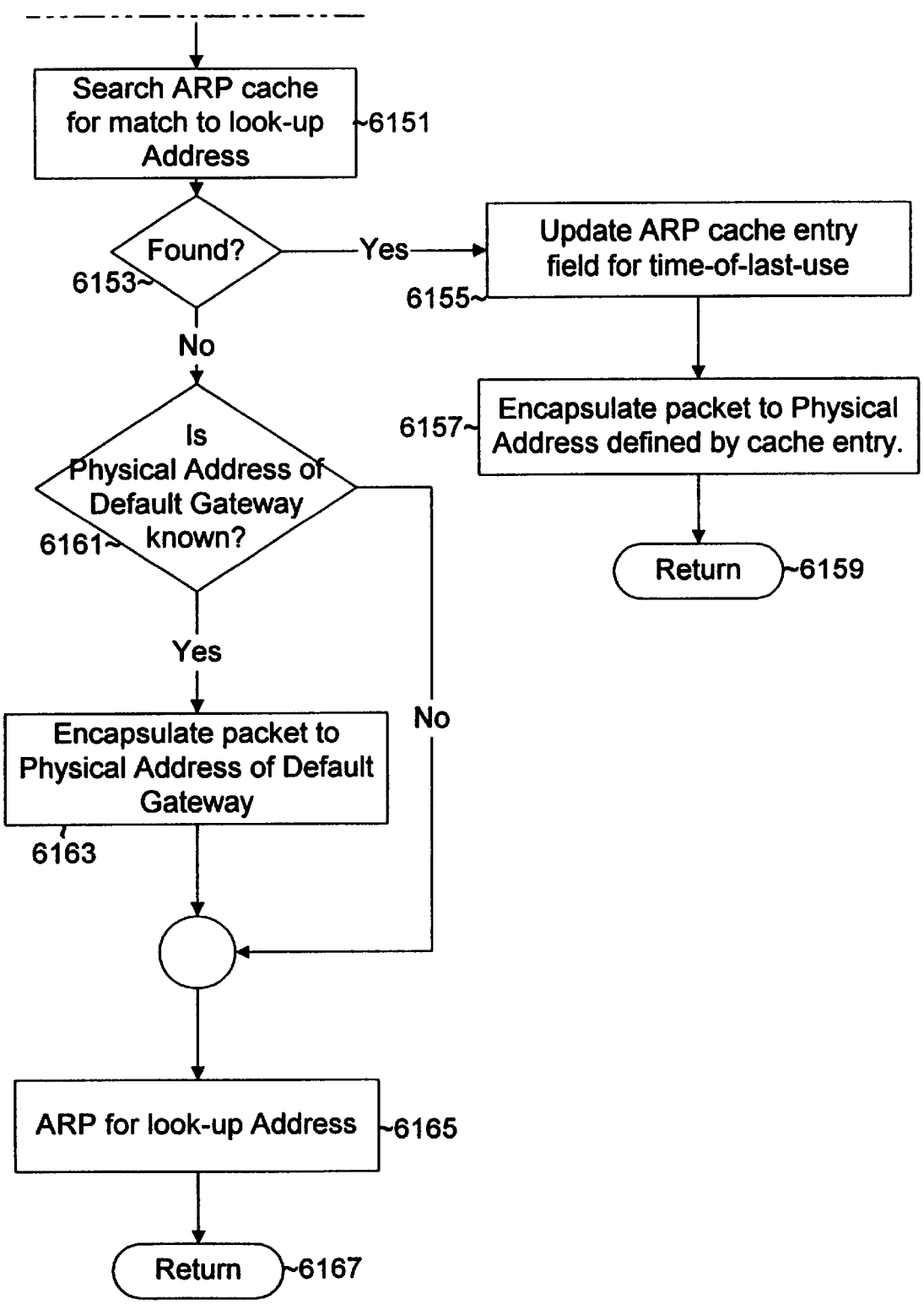
Figure 6M:
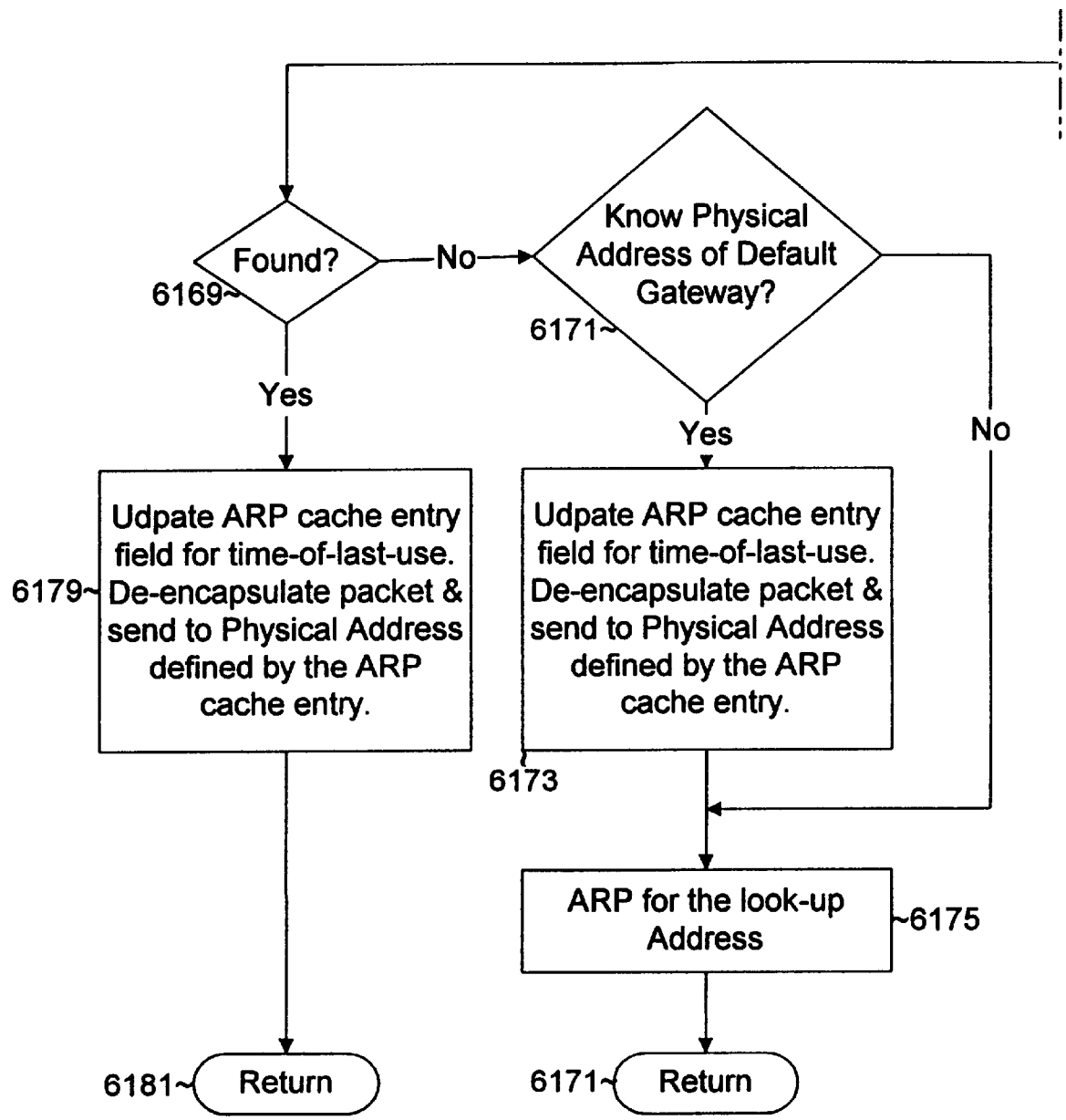

Starting on FIG. 6A at Block 601, is the handle IP Protocol packet procedure. This is the code that handles any packet that's an IP Packet. In Block 603 we want to check to see if we know our remote network Protocol Address. Again, if the answer is no, then we call receive BOOTP to check if this is a BOOTP reply. If it is, did we learn our site Protocol Address? If the answer is no, then we simply return without doing anything with the packet. If the answer is yes, then execution of the software determines whether the default gateway and subnet mask are also ascertained. These are optional fields in the BOOTP reply (shown in Block 611). If the answer to that is no, then execution of the software goes down to Block 615 and returns. If the answer to that is yes, then in Block 613 we set the BOOTP state is Ready and execution of the software transmits an ARP message to determine the default gateway. In Block 617 Network Protocol Address has been determined and now execution of the software checks whether this is an Protocol version 4 packet. If it is, in Block 621 execution of the software determines the Protocol header length, the source and destination Address.

In Block 623 execution of the software checks whether this a Controller-to-Controller Protocol message. If it is, then execution of the software precedes to Block 625 and calls the procedure handleControllerPacket, returning in Block 627, and that returns from handleControllerPacket. Otherwise, if it's not a Controller-to-Controller Protocol message, in Block 629 execution of the software checks whether this packet from one of the portable device interfaces. If it is not, then in Block 631 execution of the software checks if this is an ICMP "Ping" request. If it is, then in Block 633, execution of the software builds and transmits a ping response and in Block 635 returns. If it's not a ping request, then in Block 637, execution of the software checks for the operating mode as a Remote Controller. If so, then in Block 639 execution of the software checks to see if this is a Remote/Local controller encapsulated packet. In other words, if the protocol number is 4. If the answer is no, then in Block 641 execution of the software searches the portable device table for a portable device with this Protocol Address. In Block 643 execution of the software checks to see whether one was found. If not, in 645, execution of the software returns. Otherwise, if one is found, then in Block 647 execution of the software copies the portable device's Physical Address into the packet destination Address field, copies the Physical Address of the Network interface to the Source Physical Address, updates the portable device table entry time-of-last-use field, and sends the packet to the portable device. Execution of the software returns in Block 649.

In Block 651 execution of the software searches the portable device table for a portable device with this Protocol Address. In Block 653 execution of the software checks to see if one was found. If not, then execution of the software returns in Block 655. Otherwise, execution of the software proceeds down to Block 657, found Yes. Then execution of the software copies the portable device's Physical Address to the destination Physical Address of the packet and copy the Physical Address of the Network interface which will be used to the source Address. We de-encapsulate the packet, copy the original packet header and data into the Remote/Local Controller header parts, and send the packet to the portable device. Continuing in Block 657, we de-encapsulate and restore the packet, meaning copy the original packet header and data over the Remote/Local Controller encapsulation header part and then send the packet to the portable device. In Block 659, execution of the software return from the handleControllerPacket procedure.

In Block 661 subsequent to Block 629, execution of the software determines that the packet is from one of the portable device interfaces. In 661 execution of the software searches the portable device table for a match based on the source Address of the packet. In Block 663 execution of the software checks to see if an entry was found. If no entry was found, then in Block 665, execution of the software creates a new entry in the table. Execution of the software copies the Physical Address, the Protocol Address from the packet into the table, and updates the time-of-first-use field. Some code is conditionally compiled for controller configurations having disks. In Block 667 execution of the software checks for operation as a Remote Controller.

In Block 669 execution of the software scans the Local Controller table. If a match is found, execution of the software stores the Local Controller Protocol Address and sets the "Local Controller is known" bit in the portable device table entry. Both of paths of Blocks 667 and 669 converge on Block 671 to update the time-of-last-use field. If the "Local Controller is known bit" is clear, execution of the software copies destination Protocol to the a current trial Local Controller Address. Execution of the software increments counters for number of bytes and packets sent and received, and stores the interface number of the interface from which this packet came in the portable device table, to record which interface is used to send messages back to the portable device. The Remote Controller might have several Network interface cards for fan-out reasons.

In Block 673 execution of the software checks whether the destination Address is on the same subnet as the remote network. If it is not, then in Block 675 execution of the software determines whether this is the Local Controller for this portable device. If it is not, then execution of the software proceeds to Block 677 to use the trial Local Controller Address. If the Local Controller is not known any other way, then a portable device can ping his Local Controller, and that's what this code is doing. So, both of those blocks (675 and 677) converge into 679, and execution of the software checks whether there is a mapped-Address entry for this portable device. In Block 681, if there is not then execution of the software creates a new entry to store the portable device's Protocol Address and the Remote Controller's Protocol Address.

Both of those blocks (679 and 681) converge in Block 683. Execution of the software copies the index of the mapped-Address entry into the portable device table entry, copies the Local Controller or trial Local Controller Address into the mapped-Address entry, and updates the time-of-last-use field in the mapped-Address field.

At Block 685, execution of the software determines whether a reply to a Controller-protocol-request from what it is currently using as the Local Controller for this portable device is received. If the answer is yes, then in Block 687, execution of the software determines anything from this Local Controller was received in the last 5 seconds If the answer is no, then execution of the software proceeds to Block 689. Alternatively, if the answer is yes, then go to Block 691. Block 689 drops into Block 691, and so the only difference is that if nothing is received from the Local Controller in the last 5 seconds, execution of the software sends a Controller-to-Controller Protocol request message (using the procedure sendMapTableEntryRequest) to the Protocol Address currently used as Local Controller for this portable device. If that is the Local Controller, then that will refresh the mapping for this portable device in case it got lost or the Controller crashed. Both of those blocks converge in Block 691 where execution of the software determines the Local Controller for this portable device. If the answer is no, then execution of the software returns in 693. Otherwise, if yes, then in Block 695 execution of the software sets the destination Protocol Address to the Local Controller's Protocol Address.

In Block 697, execution of the software determines whether this Protocol Address in the same subnet as the remote network interface, so as to determine whether the gateway is used. In Block 699, execution of the software looks-up on the default gateway Protocol Address. Otherwise, in Block 6101 execution of the software does a look-up on the destination Protocol Address. That would be the case for sending to the same subnet. Both of those blocks (699 and 6101) converge in Block 6103 to search the ARP cache for a match to whichever of these two Addresses is going to be used. In Block 6105, if not found, then execution of the software determines the Physical Address of the default gateway in Block 6107. If that is unknown, then in Block 6109 execution of the software returns and drops the packet. In Block 6111 if the default gateway map Address is known, then execution of the software encapsulates the packet and sends it to the default gateway, returning in Block 6113.

Otherwise, if in 6105 execution of the software found the entry, then the packet is encapsulated. The destination Physical Address is taken from the ARP cache entry in 6115, and execution of the software returns in 6117. For the sake of simplicity, in the flow charts, encapsulating the packets in both of these blocks includes transmitting it. Moving on now to Block 6119, from Block 673, execution of the software determines whether the destination Address is on the same subnet as the remote network. If the answer is yes (in 6119), then execution of the software determines whether there is an ARP cache entry for this destination. If the answer to that question is no, then in Block 6121, execution of the software determines the Physical Address of the default gateway. This is again doing as discussed previously herein, deciding whether the map Address to send is determined, or whether the packet is sent by way of the gateway. If the gateway is not used, then in Block 6123 execution of the software drops the packet and returns. If at least the gateway is known, then in 6125 execution of the software copies the default gateway's Physical Address to the destination Address of the packet and sends the packet, and returns in 6127.

If the ARP entry is known for where execution of the software is trying to send this, then in 6129 execution of the software copies the ARP table entry's Physical Address to the destination at the Address of the packet and transmits the packet, and then execution of the software returns in 6131.

In Block 6133, from 637, if the controller is not acting as a Remote Controller, that has to mean it is acting as the local Controller. Now the relevant tests are whether this packet is addressed to the remote network interface and whether this packet is encapsulated. If the answer is no, then in Block 6137 execution of the software searches the mapped Address table for an entry for the packet's destination Protocol Address. In Block 6139, execution of the software checks if it's found. If not, then in Block 6141 execution of the software returns. In Block 6133, if the answer is yes, this was a packet Addressed to the remote network interface and it was encapsulated. Then in Block 6135 execution of the software gets the original Protocol header, gets the destination Address, and checks if the packet is destined for the same subnet. If so, it checks the ARP cache for this Protocol Address. Otherwise, it checks the ARP cache for an entry default gateway.

In Block 6139, if the answer is yes (an entry was found), then in Block 6143 execution of the software updates the table entry's time-of-last-use. In Block 6145 execution of the software tests whether the portable device Protocol Address is on the local subnet. If yes, then in Block 6147 the look-up becomes the portable device Protocol Address. Otherwise, if no (in Block 6145), then in 6149 the look-up Address becomes the portable device Protocol Address.

In Block 6151, execution of the software searches the ARP cache for a match to look-up Address. In Block 6153 execution of the software checks if it's found. If yes, then in Block 6155, execution of the software updates ARP cache entry time-of-last-use field. In Block 6157 execution of the software encapsulates the packet to the Physical Address defined by the cache entry and transmits it. In 6159 execution of the software returns. Otherwise, if execution of the software did not find an entry in 6153, then execution proceeds to Block 6161 to determine the Physical Address of the default gateway. If the answer is yes, then proceed to Block 6163. If the answer is no, then execution of the software proceeds to Block 6165. In Block 6163, the controller encapsulates the packet to Physical Address at default gateway. In Block 6165 execution of the software sends an ARP message to determine the look-up Address. In Block 6167 execution of the software returns.

Moving on now to Block 6169, from Block 6135, execution of the software checks to see if this search found something. If not, then execution of the software determines whether the Physical Address of the default gateway (in Block 6171) is known. If yes, then proceed to Block 6173. If no, then proceed to Block 6175. In Block 6173 execution of the software updates the ARP cache entry's time-of-last-use field, de-encapsulates and re-generates the packet, and sends to the Physical Address defined by the ARP cache entry.

Proceeding to Block 6175, from Block 6173 or from a no answer in Block 6171, execution of the software transmits an ARP message for the look-up Address. Then in Block 6177 execution of the software returns. Proceeding to Block 6179 (from Block 6169) if execution of the software found an entry, execution of the software updates the ARP cache entry's time-of-last-use field, de-encapsulate and re-generates the packet, and sends the Physical Address defined by the ARP cache entry. In Block 6181 execution of the software returns.

Figure 7C:
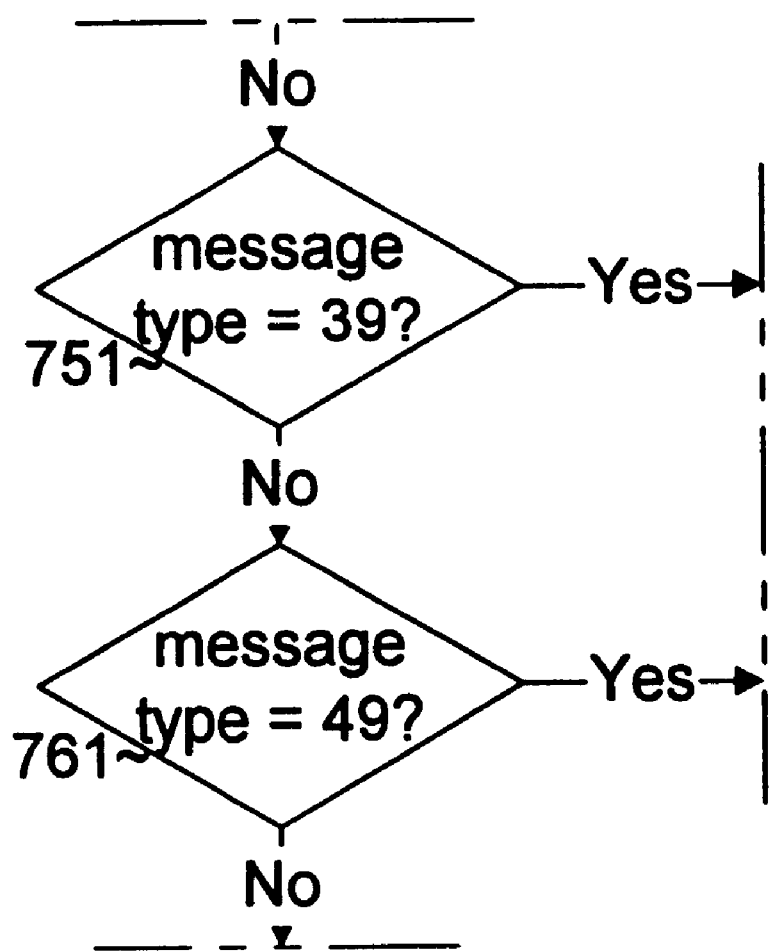
Figure 7E:
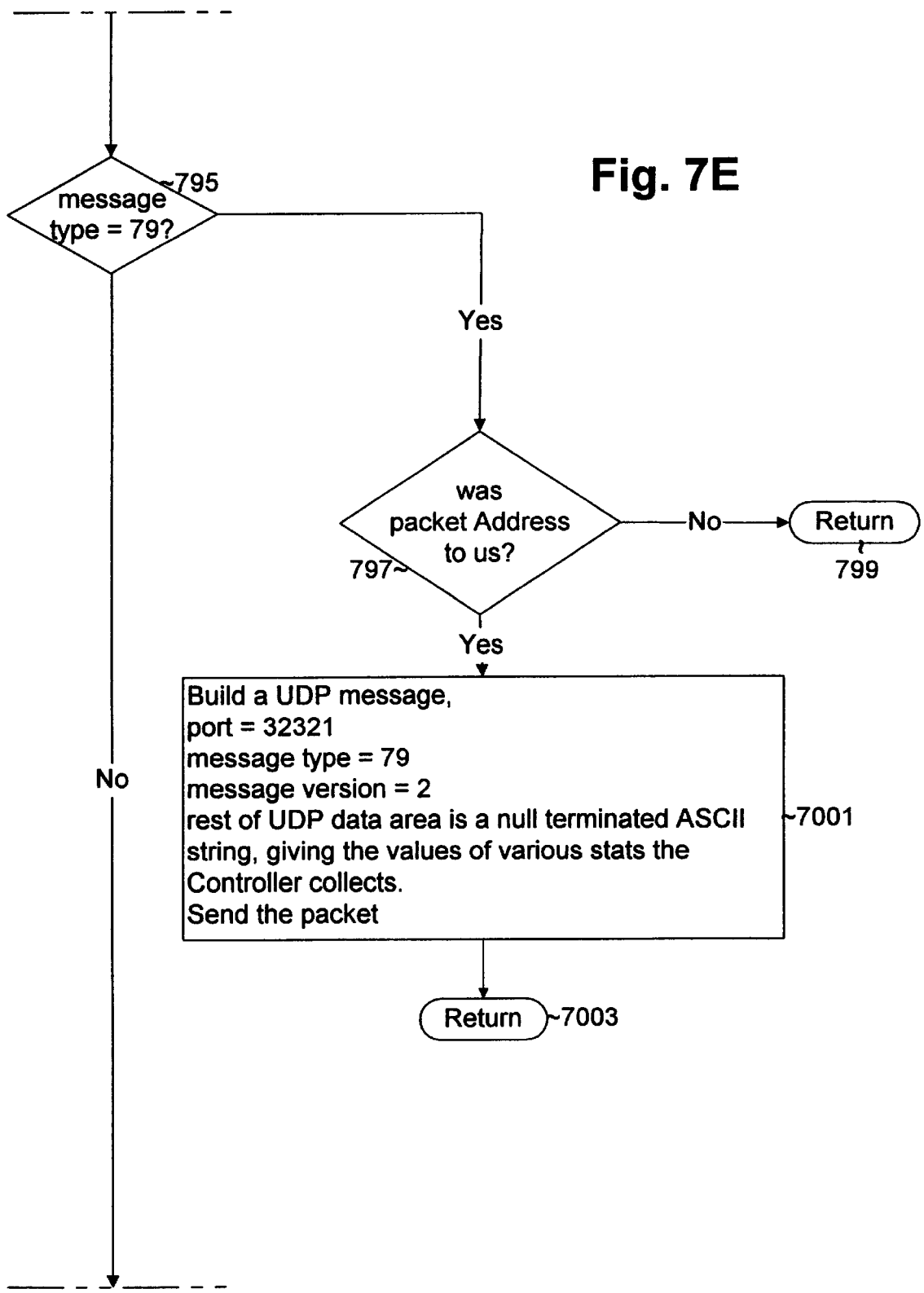
Figure 7F:
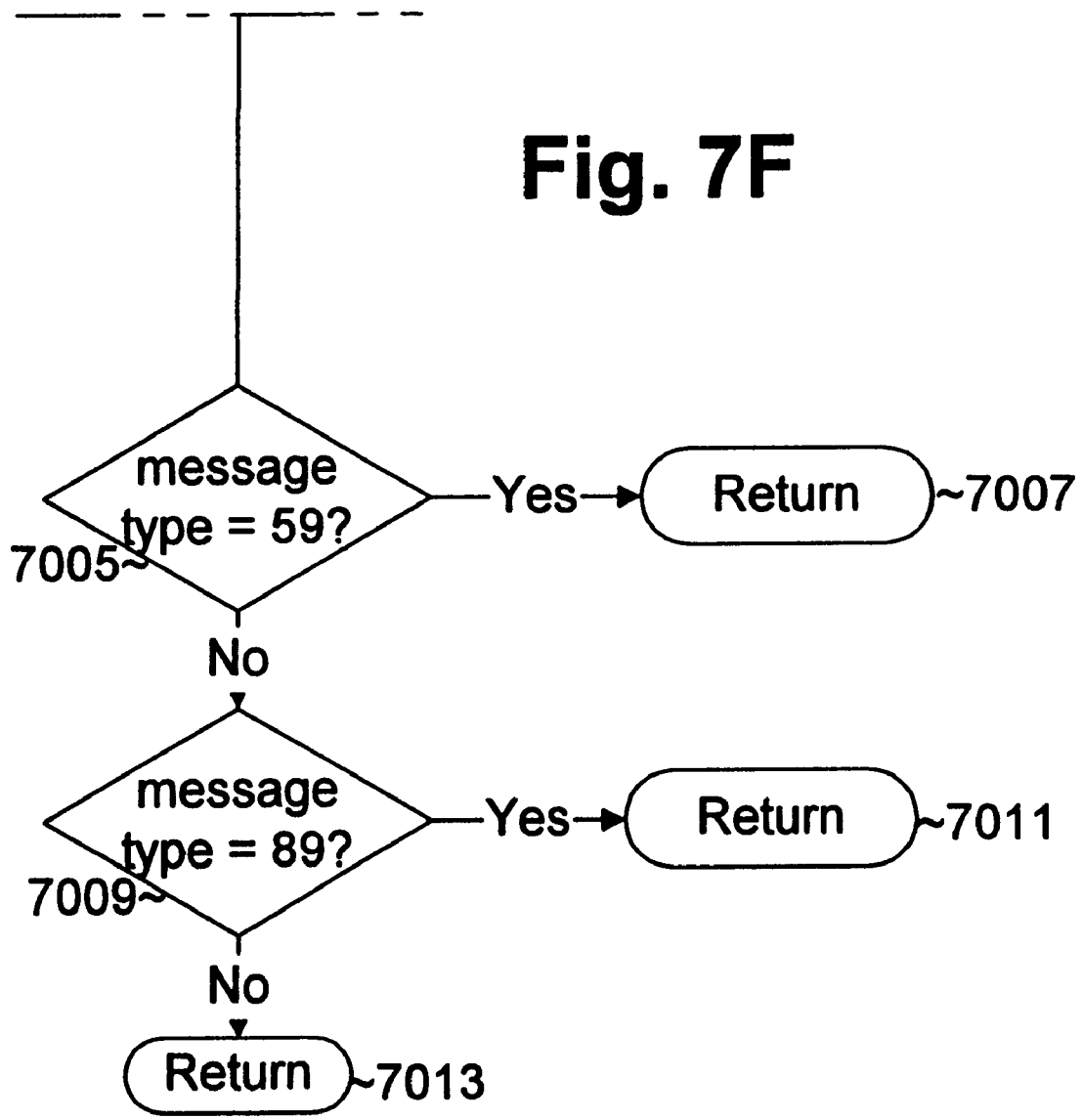
Figure 7H:
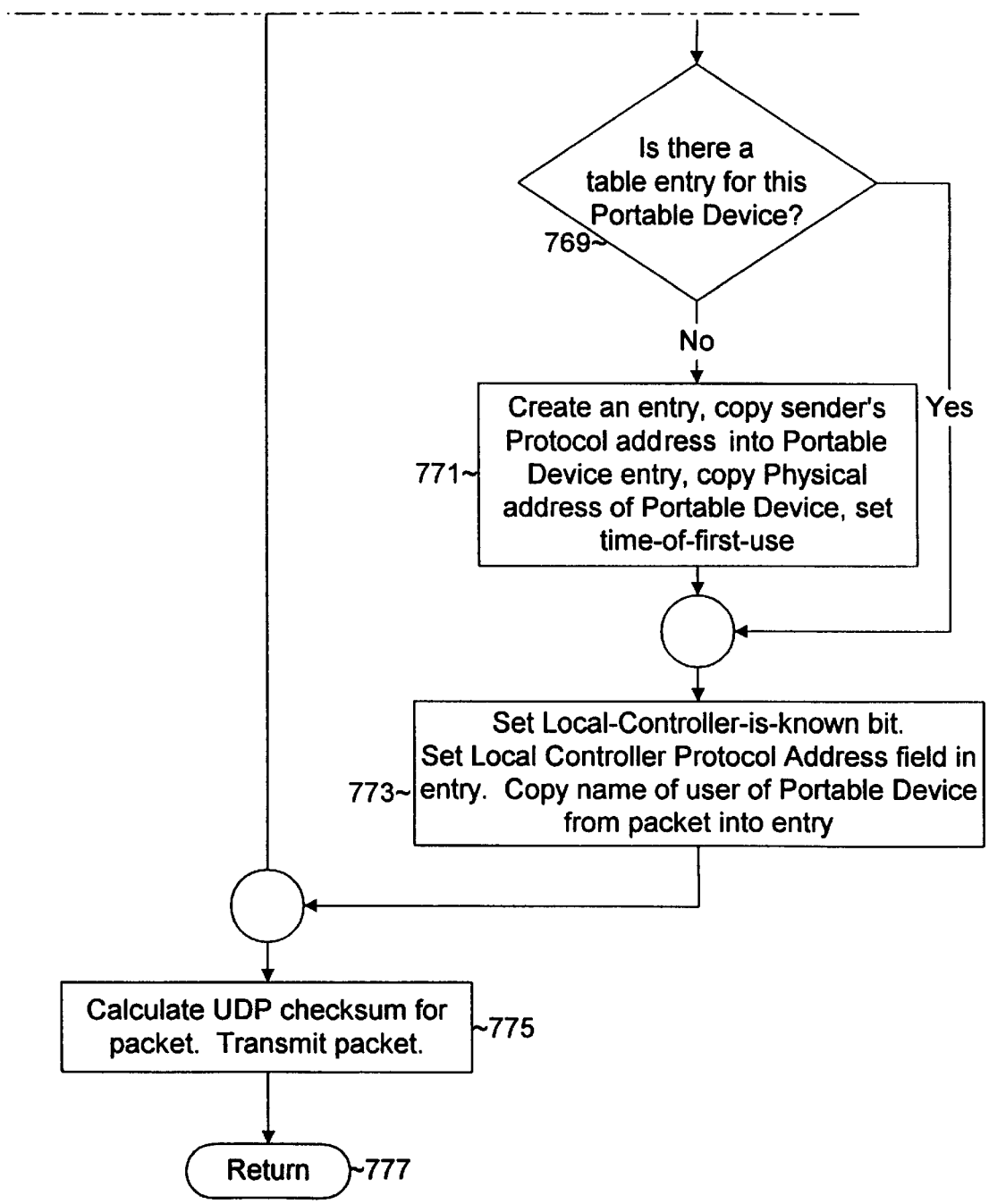

In FIG. 7a, Block 701 begins the procedure handleControllerProtocol. This procedure is called for any message that's on the Controller-to-Controller protocol port numbers and which is addressed to this controller. Block 701 determines whether remote network Protocol Address is known. In the answer is no, then in Block 703 execution of the software returns without doing anything to the packets, just ignoring them. If the answer is yes, then Block 705 determines whether the message protocol version number is equal to 2. If not, in Block 707 execution of the software returns.

The software executes a series of checks for message types. So, if the message type is 19 in Block 709, execution of the software proceeds to Block 711, to determine whether the destination Protocol Address is equal to the remote network Protocol Address. If the answer is no, then execution of the software returns and the message is ignored because it's not meant for the controller.

Of course the Network interfaces of the remote controller are set into Promiscuous Mode. If there happen to be several of these boxes on the same Network, they are going to be seeing each other's Controller-to-Controller protocol messages. They need to ignore the ones that aren't meant for them.

In Block 715, it means it was Addressed to this controller. Execution of the software checks whether a mapped-Address table already exists, searching by the portable device's Protocol Address. If not found, execution of the software creates a new table entry for it, storing the portable device Protocol Address, the Remote Controller and Local Controller Address, the time-of-last-use field in either case, meaning a case where an entry was found or the case where creation of a new entry was required. Execution of the software sets the time-of-last-use in either case, and builds an Controller-Protocol-Response packet and send back to the Remote Controller. Execution of the software builds and sends unsolicited ARP replies so that machines in the local subnet have an opportunity to update their caches. In Block 717 execution of the software returns.

In Block 719 if the message type was 29, then execution of the software proceeds to Block 721 to determine whether the message sent to this controller. If not, then in Block 723 execution returns. Otherwise, if it was meant for this controller. In Block 725, the software checks the mapped-Address tables, searching by portable device Address. If found in Block 727, then execution of the software proceeds to Block 729. In Block 729, execution of the software sets the "response received" bit in the mapped-Address table entry and returns in Block 730. Otherwise, in 727 if no entry was found then in Block 731, execution of the software determines whether there is a portable device table entry for this. If not, then in Block 733 execution returns. Otherwise, in Block 735 the answer is yes, and execution of the software sets the "Local Controller is known" bit in the portable device table entry. That means that the Local Controller is known, because it's just responded to the Controller-to-Controller protocol message, and only Local Controllers will do that. So for now on trial Addresses won't be used and this Address will be used.

In Block 737, execution of the software determines whether this Local Controller is already in the table of Local Controllers. If the answer is no in Block 739, execution of the software adds the Controller to table and Address to file of Controllers. This is the table providing that, for a given Protocol Address, execution of the software determines the Local Controller to use in the future. That's one of the three methods for looking up which Local Controller to use for a given portable device. In both Block 737 and Block 739, they both converge on Block 741 which is just a return.

Moving on now to Block 751, if the message type is 39, then execution of the software moves to Block 753, to determine whether there is an entry in the mapped-Address table for this portable device. If there isn't, then execution of the software ignores it in Block 759. In Block 755, if yes, then execution of the software clears the "in use" bit of the mapped-Address entry, thereby making it available for other uses and not a candidate for searches. So, message type 39 is the one that gets sent when the portable device disconnects. This clears the entry, so the remote controller is going to inform the local Controller to clear the entry for this portable device it has moved. It returns in Block 757.

In Block 761 if the message type is 49, then execution of the software moves to Block 763, and builds a response message packet. Message content will be the same except for the message as shown below. If the operating mode is as a Remote Controller in Block 765, then the message type will be a Controller-to-Controller Protocol Response as in Block 767.

Block 769 determines whether there is a portable device entry for this portable device. If the answer is yes, then in Block 771, execution of the software creates an entry, copies the sender's Protocol Address into the portable device entry, copies Physical Address of portable device, and sets the time-of-first-use. If in Block 769 the answer was yes, we converge then in both cases to Block 773, so that execution of the software sets the "Local Controller is known" bit, sets the Local Controller Protocol Address field in the entry and copies the name of the user of the portable device from packet into the entry. Part of the Controller-to-Controller Protocol message includes a field that says the name of the user of portable device, for later extensions that would make it possible to find people when they are roaming around. In block 775, execution of the software calculates the UP checksum for the packet and transmits the packet. In Block 777 execution of the software returns.

In Block 781, execution of the software determines whether the message type is 69. In Block 783, execution of the software checks whether the packet was received from the remote network. If it was, then execution of the software checks to see if the packet was Addressed to this controller. If it was not, then in Block 787 execution of the software returns. Otherwise, from Block 783 if it was not received from the remote network, execution of the software proceeds to Block 789.

If the packet was Addressed to this controller, execution of the software proceeds to Block 789, to build an entry for the response. It's a UP message and the UP data is byte 0 and contains 69 (decimal). Byte 1 contains a 2. Bytes 2 and 3 contain the number of portable device entries in the message. This will be in Intel little-endian format, meaning the first byte has the least significant bits and the second byte has the most significant bits. Bytes 4–7 have a time stamp when sent, again in Intel little-endian format. Bytes 8 and following are repeat of this pattern for the number of entries. Time-of-first-use, 4 bytes, Intel little-endian. Time-stamp of last use, 4 bytes, Intel, little-endian. Time-stamp of last received packet, 4 bytes, Intel little-endian. Physical Address is 6 bytes. User's name is a null-terminated string up to 80 bytes. Mapped-table index is 2 bytes, little-endian. Portable device Protocol Address is 4 bytes, network byte order, which is in big-endian format. Portable device Protocol trial Address is 4 bytes, network byte order. Number of packets sent or received is 4 bytes, unsigned, little-endian. The interface number is 1 byte.

For the Flags bits: 0 means the entry is in use; Bit 1, if set, means the Local Controller is known. Bit 0 means the least significant bit of this byte. Accordingly, the aforementioned is the format of the message.

In Block 791, execution of the software checks to see if there are more entries in the table. If the answer is yes, execution of the software goes back up to the top and send another such message. If the answer is no, then execution of the software returns.

In Block 795, execution of the software tests the message types. Message types 39, 49 and 69 have already been tested. In Block 795 execution of the software checks to see if it's type 79. If the answer is yes, then execution of the software proceeds to Block 797 and checks to see if the packet was addressed to this controller. If it's not, execution of the software returns in Block 799. If it was addressed to this controller, then in Block 7001 execution of the software builds a UDP message: the port is 32321; the message type is 79; and the message version is 2. The rest of the UDP data area is a null-terminated ASCII string, giving the values of various statistics the Controller collects. Message type 79 is just "send me certain sets of statistics". Sprintf ( ) is used to build strings of those, and then it sends the packet back. In Block 7003, execution returns. If the message type is not 69, 79 and so on, then if it is 59 in Block 7005, then in Block 7007 execution returns. If in Block 7009 the message type is 89, execution returns. Otherwise, in Block 7013 execution of the software returns.

FIG. 8 is a diagram illustrating and summarizing data structures employed in conjunction with the software of the preferred embodiment of the invention and discussed previously herein with respect to the flow charts.

Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

What is claimed is:

1. An apparatus comprising:
   a remote network coupled with a local network;
   a portable device coupled with the remote network for generating an initial data packet, having a source header of a first point of the local network, and destined for a local device coupled to a second point of the local network;
   a local controller; and
   a remote controller for generating from the initial data packet at least one subsequent data packet destined for the local controller and including a data message that encapsulates addresses of the first and second points of the local network; including
      a comparator of data message length to a value; and
      a data packet controller for one subsequent data packet if the data message length is less than the value, and for two subsequent data packets if the data message length is greater than the value.

2. An apparatus comprising:
   a remote network coupled with a local network;
   a portable device coupled with the remote network for generating an initial data packet having a source header of a first point of the local network, and destined for a local device coupled to a second point of the local network;
   a local controller;
   a remote controller for generating from the initial data packet at least one subsequent data packet destined for the local controller and including a data message that encapsulates addresses of the first and second points of the local network; including:
      a comparator of data message length to a value; and
      a fragmenter of the data message into an initial portion and a remainder portion if the data message length is greater than the value.

3. An apparatus as in claim 2 further comprising
   a data packet controller for controlling generation of the subsequent data packet including the initial portion and generation of another subsequent data packet including the remainder portion if the length of the data message is greater than the predetermined value.

4. An apparatus as in claim 2
   wherein the remote controller further includes:
      a record entry of an address identifying the location of the local controller, which is associated with a record entry of the address identifying the second point where the local device is connected to the local network; and
      a record retriever for retrieving the address for identifying the local controller, based upon the address of the second tap point where the local device is connected to the local network.

5. A method comprising:
   providing a local network and a local controller coupled with a remote network and a remote controller;
   providing a portable device coupled with the remote and a local device coupled with the local network;
   using the portable device to generate an initial data packet, having a source header of a first point of the local network, and destined for the local device coupled to a second point of the local network;
   using the remote controller to generate from the initial data packet at least one subsequent data packet, destined for the local controller and including a data message that encapsulates addresses of the first and second points of the local network;
   comparing length of the data message to a value; and
   generating one subsequent data packet if the length of the data message is less than the value; and
      generating two subsequent data packets if the length of the data message is greater than the value.

* * * * *

UNITED STATES PATENT AND TRADEMARK OFFICE
CERTIFICATE OF CORRECTION

PATENT NO. : 6,141,690  
DATED : October 31, 2000  
INVENTOR(S) : Lyle A. Weiman It is certified that error appears in the above-identified patent and that said Letters Patent is hereby corrected as shown below:

<u>Column 18,</u>
Line 39, after "the remote" insert -- network --

Signed and Sealed this

Eighth Day of October, 2002

Attest:

JAMES E. ROGAN
*Attesting Officer*     *Director of the United States Patent and Trademark Office*